United States Patent
Cox et al.

(10) Patent No.: US 6,931,247 B2
(45) Date of Patent: Aug. 16, 2005

(54) AIRCRAFT CONTROL METHOD

(75) Inventors: Earl C. Cox, La Crescenta, CA (US); Kyle D. Swanson, Simi Valley, CA (US)

(73) Assignee: Aerovironment, Inc., Monrovia, CA (US)

(*) Notice: Subject to any disclaimer, the term of this patent is extended or adjusted under 35 U.S.C. 154(b) by 798 days.

(21) Appl. No.: 09/789,450

(22) Filed: Feb. 20, 2001

(65) Prior Publication Data

US 2005/0118952 A1 Jun. 2, 2005

Related U.S. Application Data

(63) Continuation of application No. 09/527,544, filed on Mar. 16, 2000, now abandoned.
(60) Provisional application No. 60/182,165, filed on Feb. 14, 2000.

(51) Int. Cl.⁷ .................................. H04Q 7/20
(52) U.S. Cl. .................. 455/431; 455/430; 455/427; 455/12.1
(58) Field of Search .................. 455/431, 430, 455/427, 3.02, 12.1, 13.1, 13.2, 436; 375/347, 200

(56) References Cited

U.S. PATENT DOCUMENTS

| | | | |
|---|---|---|---|
| 2,626,348 A | 1/1953 | Nobles | 250/15 |
| 4,354,646 A | 10/1982 | Raymer | 244/87 |
| 4,375,697 A | 3/1983 | Visher | 455/13 |

(Continued)

FOREIGN PATENT DOCUMENTS

| | | |
|---|---|---|
| DE | 43 08 758 A1 | 9/1994 |
| DE | 296 16 989 U1 | 1/1997 |
| FR | 2 721 458 | 12/1995 |
| GB | 2 082 995 A | 3/1982 |

(Continued)

OTHER PUBLICATIONS

Flittie, K. and Curtin, B., "Pathfinder Solar–Powered Aircraft Flight Performance," AIAA Paper 98–4446, Aug., 1998, pp. 618–632.

Djuknic, G. M., Freidenfelds, J., and Okunev, Y., "Establishing Wireless Communications Services via High–Altitude Aeronautical Platforms: A Concept Whose Time Has Come?," IEEE Communications Magazine, Sep. 1997, pp. 128–135.

*Primary Examiner*—Nick Corsaro
*Assistant Examiner*—Tan Trinh

(57) ABSTRACT

This disclosure provides a solar rechargeable aircraft that is inexpensive to produce, is steerable, and can remain airborne almost indefinitely. The preferred aircraft is a span-loaded flying wing, having no fuselage or rudder. Traveling at relatively slow speeds, and having a two-hundred foot wingspan that mounts photovoltaic cells on most all of the wing's top surface, the aircraft uses only differential thrust of its eight propellers to turn. Each of five segments of the wing has one or more motors and photovoltaic arrays, and produces its own lift independent of the other segments, to avoid loading them. Five two-sided photovoltaic arrays, in all, are mounted on the wing, and receive photovoltaic energy both incident on top of the wing, and which is incident also from below, through a bottom, transparent surface. The aircraft includes hinges and actuators capable of providing an adjustable dihedral for the wing. The actuators can be motors or control surfaces. Alternately, the actuators can be movable masses within the wing, which may be capable of deforming the wing to alter the aerodynamics of the wing, and thereby actuate the hinges. Because of wing dihedral, the aircraft includes motors both above and below the center of drag, and the aircraft uses differential thrust to control aircraft pitch. The aircraft has a wide variety of applications, which include serving as a long term high altitude platform that serves to link a ground station using radio wave signals and a satellite using optical signals.

10 Claims, 28 Drawing Sheets

U.S. PATENT DOCUMENTS

| | | | |
|---|---|---|---|
| 4,566,657 A | 1/1986 | Grow | 244/90 A |
| 4,568,043 A | 2/1986 | Schmittle | 244/48 |
| 4,601,443 A | 7/1986 | Jones et al. | 244/13 |
| 4,781,341 A | 11/1988 | Kasper | 244/13 |
| 4,928,317 A | 5/1990 | Franchini | 455/601 |
| 5,078,338 A | 1/1992 | O'Neill et al. | 244/47 |
| 5,099,245 A * | 3/1992 | Sagey | 342/357.01 |
| 5,465,170 A | 11/1995 | Arimoto | 359/159 |
| 5,652,750 A | 7/1997 | Dent et al. | 370/326 |
| 5,710,652 A | 1/1998 | Bloom et al. | 359/152 |
| 5,808,472 A | 9/1998 | Hayes | 324/671 |
| 5,810,284 A * | 9/1998 | Hibbs et al. | 244/13 |
| 5,918,176 A * | 6/1999 | Arrington et al. | 455/430 |
| 5,991,345 A * | 11/1999 | Ramasastry | 375/347 |
| 6,643,509 B1 * | 11/2003 | Crow | 455/431 |

FOREIGN PATENT DOCUMENTS

| | | | |
|---|---|---|---|
| JP | 04325395 | | 11/1992 |
| JP | 11-348894 | | 12/1999 |
| WO | 1446609 | | 9/1965 |
| WO | 1 215 222 | | 4/1966 |
| WO | WO 95/04407 | | 2/1995 |
| WO | WO 95/12237 | | 5/1995 |
| WO | WO 97/33790 | | 9/1997 |
| WO | WO 98/35506 | | 8/1998 |
| WO | WO 99/13598 | * | 3/1999 |
| WO | WO 99/23769 | * | 5/1999 |

* cited by examiner

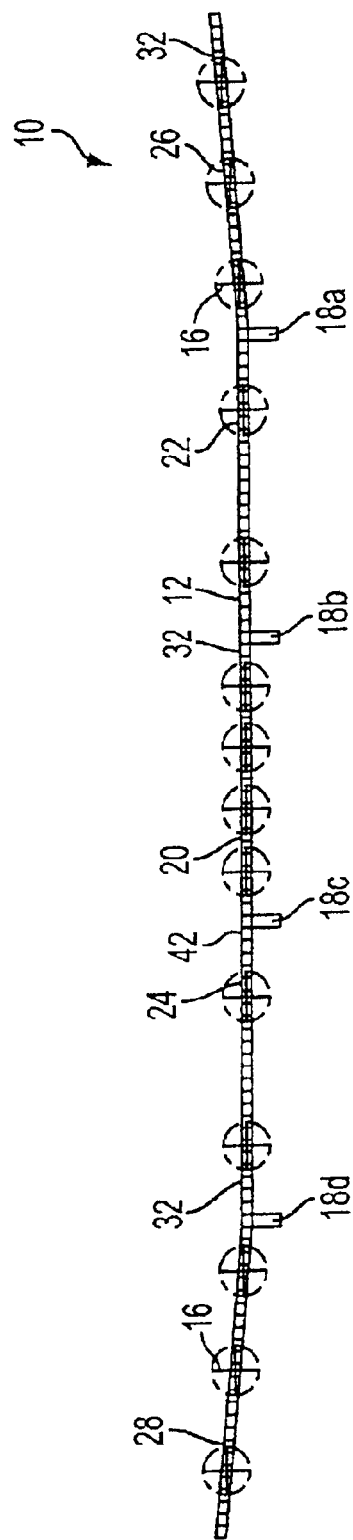
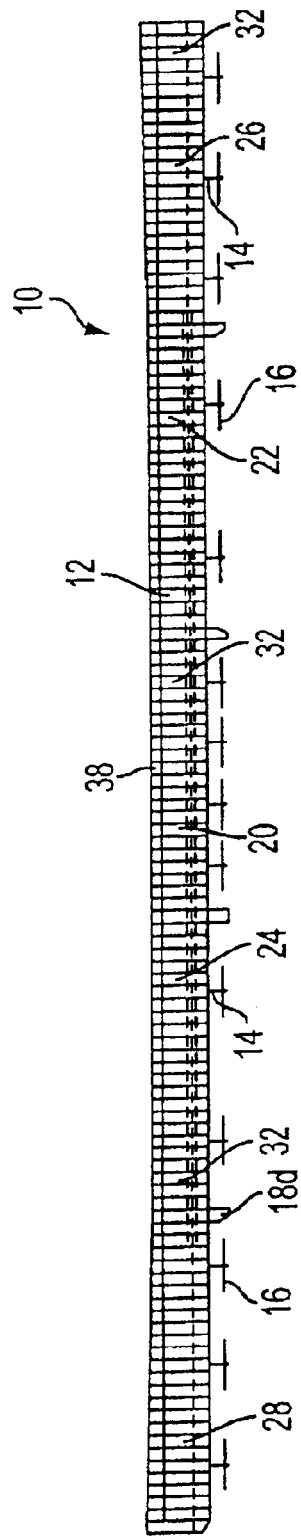

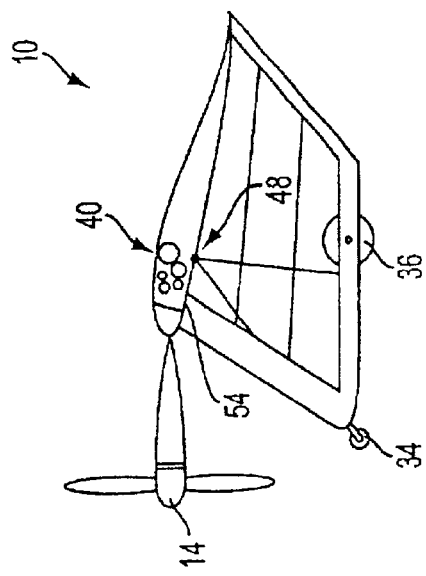
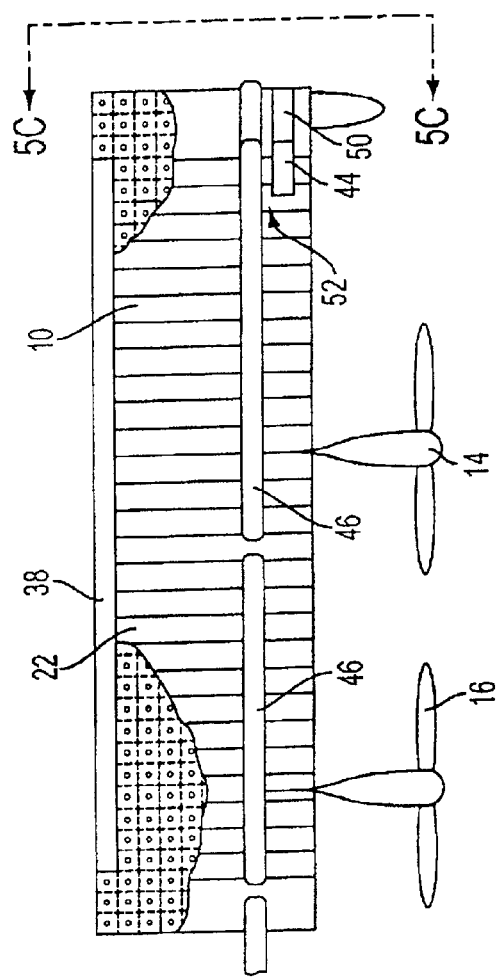
FIG. 5C
FIG. 5B

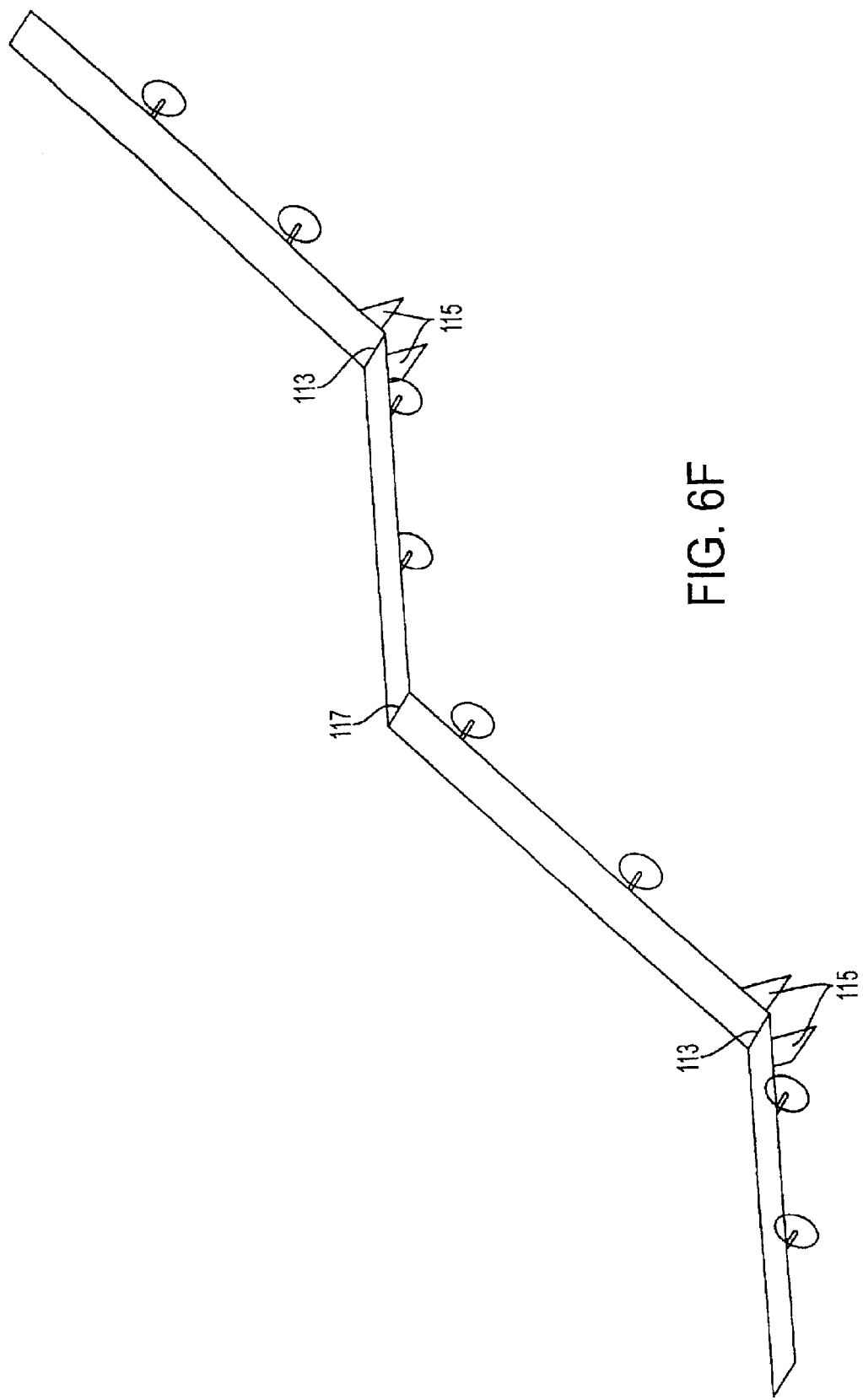

AIRCRAFT CONTROL METHOD

The present application is a continuation of application Ser. No. 09/527,544, filed Mar. 16, 2000 now abandoned, which claims priority from Provisional Application Ser. No. 60/182,165, filed Feb. 14, 2000.

The present invention relates to aircraft. More particularly, the present invention relates to aircraft having unique controls, and related uses thereof.

BACKGROUND

Aircraft are used in a wide variety of applications, including travel, transportation, fire fighting, surveillance and combat. Various aircraft have been designed to fill the wide array of functional roles defined by these applications. Included among these aircraft are balloons, dirigibles, traditional fixed wing aircraft, flying wings and helicopters.

One functional role that a few aircraft have been designed to fill is that of a high altitude platform. Operating from high, sub-orbital altitudes, such aircraft can monitor weather patterns, conduct atmospheric research and surveil a wide variety of subjects. Most of these remarkable aircraft have limited flight duration due to fuel limitations. However, a number of aircraft have been proposed that are solar powered, and that can sustain continuous flight for as long as sunlight is available, or even longer.

Two such aircraft were actually constructed, being the well known Pathfinder and Centurion aircraft, which have each set numerous flight records. The basic design underlying these two aircraft is discussed at length in U.S. Pat. No. 5,810,284, which is directed toward an unswept flying wing aircraft having a very high aspect ratio and a relatively constant chord and airfoil. While these aircraft are quite noteworthy for their long term flight potential, they do have limits in their available power and payload.

The Pathfinder and Centurion aircraft are designed as flying wings that include a number of self-sufficient wing sections, each having one or more electric motors that are driven by power generated in solar cells mounted in that section, and each generating enough lift to support its own weight. To minimize weight, the aircraft structure is highly flexible, and is designed to withstand only relatively small torsional loads along its lateral axis. The aircraft's wing has little or no dihedral while on the ground. However, due to the high flexibility, the large aspect ratio and the constant chord, in-flight wing loads tend to cause the wing to develop a substantial dihedral angle at the wingtips.

To minimize the torsional loads, the aircraft wing includes elevators along a substantial portion of its trailing edge (i.e., the trailing edge of the flying wing). The aircraft does not include a rudder or ailerons, and the elevators are not designed as elevons (i.e., the can not move in contrary directions near opposite wingtips). Instead, the aircraft turns (and otherwise controls yaw) by using variable thrust applied across the wingspan through the application of different power levels to different motors. Roll is passively controlled by the dihedral of the wing, which is developed in flight. Sideslip is also passively controlled, both by the dihedral of the wing, and by fins that extend down from a number of wing segments in a direction normal to plane of the wing at the fin's span- wise location.

Long duration high altitude platforms that operate at sub-orbital altitudes, such as the Pathfinder and Centurion aircraft, have been suggested for use in a variety of functions. As one example, a high altitude platform equipped with microwave communications equipment could provide communication relay services between remote areas. In another example, high altitude platforms could measure and study winds, storms or pollutants in the atmosphere. Similarly, governments could use these aircraft to monitor troop movements or narcotics production. Other types aircraft are not optimally suited to these tasks, because they are limited by the amount of combustible fuels that they use, which are heavy, expensive and are consumed very quickly. Typically, these other types of aircraft cannot remain over their desired location for any significant length of time, and hence, are of limited utility in performing these tasks.

One way around these operational limitations is to use satellites as high altitude platforms. However, satellites are expensive to launch, and typically remain in a permanent, fixed orbit. Some satellites can change their orbit to a limited degree; however, this is done only with great difficulty and expense, and there is a fuel limit to how many orbital changes a satellite may make. For example, if it is desired to measure and study a hurricane that originates in Africa and travels towards the Gulf coast of the United States, satellites cannot, practically-speaking, be asked to follow and track such a storm.

The use of satellites is also disadvantageous for many types of measurement and surveillance as well, because satellites orbit outside the Earth's atmosphere. That is to say, satellites as a practical matter cannot use many tools which optimally require contact with the atmosphere. Photographic images taken by a satellite are also sometimes less than optimal, since the target is usually a great distance from the satellite. Finally, satellites are not easily brought back to Earth and retrieved, e.g., for servicing, and so are typically used only for one very expensive, special purpose task.

Given the broad range of functions that a long duration, sub-orbital platform has the potential to perform, it is desirable to design such platforms to be capable of handling larger payloads and power demands. The platforms could be variations of existing platforms, such as the Pathfinder and Centurion aircraft, or they could be newly designed high altitude platforms.

Likewise, given a high altitude platform with expanded payload and power capabilities, it is desirable to find new uses for the platform. Such new uses can increase demand for the aircraft, and thereby cause increased production and lower production costs. Naturally, new uses also have the potential for new advantages for the public.

In sum, there exists a definite need for a multi-purpose aircraft that can remain airborne for long durations without the need to re-fuel. Preferably, such an aircraft should be able to operate up to very high, sub-orbital altitudes. Importantly, it is desirable for such an aircraft to have the capability for larger payloads and/or power supply requirements. Furthermore, there exists a need for such an aircraft to be inexpensive to build and operate and, furthermore, pollution-free. Also, a definite need exists for such an aircraft to be able to perform surveillance, testing and measurement functions while being steerable, mobile, and able to perform varying missions of extended duration. Finally, with the availability of the hardware of the present invention, it should be noted that a broad variety of communications needs exist that such a high altitude platform can fill. Various embodiments of the present invention can meet some or all of these needs, and provides further, related advantages.

SUMMARY OF THE INVENTION

The present invention solves the needs mentioned above by providing a solar powered aircraft that is inexpensive to produce and can remain aloft almost indefinitely, that is, at least until its parts wear out. Thus, the present invention provides an aircraft that is perfectly suited to many applications requiring a high altitude platform. For example, the aircraft could be guided to follow a hurricane, and using equipment on board, study how such storms originate and develop. Alternatively, the present aircraft provides a sub-orbital platform that can be used to convert radio wave signals from a ground station to optical signals directed to a satellite, or other spacecraft, that is above sub-orbital altitudes. Likewise, the aircraft can be coupled with a large number of ground stations to create broadband and/or wireless networks. However, the present aircraft is not only far less expensive to produce than satellites; it is retrievable and may be re-used for the same or different tasks. By using solar power, the present aircraft is completely pollution free, and thus, provides potent promise for displacing the use of combustion-powered aircraft in many of these applications.

The aircraft of the invention typically includes a wing, including a first wing portion and a second wing portion, with a solar cell array mounted on the wing. The aircraft preferably features a hinge mechanism that is connected to the first wing portion, and is configured to allow a pivoting of the first wing portion relative to the second wing portion. Each wing portion is preferably configured to generate enough lift to carry its own weight while the aircraft is in flight, and the pivoting is preferably limited to a value that generally allows each wing portion to continue to generate enough lift to carry its own weight. The aircraft can also feature a hinge actuator configured to control the hinge mechanism such that the dihedral of the first and second wing portions can be altered with respect to each other during flight. Finally, a control system is preferably connected to the hinge actuator, causing it to actuate the hinge such that the dihedral is greater during time periods when a greater dihedral will increase the power generated by the solar cells.

Preferably, the aircraft is a flying wing aircraft including a plurality of sequentially connected, unswept, wing segments (most preferably five or more wing segments). Also, preferably the hinge actuator includes a mass actuator configured to translate the center of gravity of a mass carried by the wing, and wherein the wing and the mass are configured such that the location of the center of gravity of the mass can drive the rotation of the hinge mechanism when the wing is in flight conditions. To drive the rotation, the mass's changing center of gravity location may deform the wing, creating aerodynamic forces.

The aircraft may also feature a laterally extending wing configured to have dihedral during flight, and a plurality of motors mounted on the wing. The wing's dihedral is configured to cause at least one motor to produce thrust along a line passing above the aircraft's center of drag, and at least one motor to produce thrust along a line passing below the aircraft's center of drag when the aircraft is in flight conditions, the motors causing downward and upward pitching moments, respectively. The aircraft also includes a control system connected to the throttle of each motor, and it controls at least one of the throttles to control the pitch of the aircraft. A remote pilot can control the aircraft through the use of redundant combinations of existing communications networks.

Other features and advantages of the invention will become apparent from the following detailed description of the preferred embodiments, taken in conjunction with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

BRIEF DESCRIPTION OF THE DRAWINGS

FIG. 1 is an elevational view of a preferred embodiment of an aircraft embodying the invention, in a zero stress position.

FIG. 2 is a plan view of the aircraft depicted in FIG. 1.

FIG. 5B is a cut-away plan view of the wing segment depicted in FIG. 5A, with a regenerative fuel cell structured within the wing.

FIG. 5C is a cross-sectional side view of the segment of FIG. 5A, taken along lines C—C of FIG. 5B.

FIG. 6F is a perspective view of the aircraft depicted in FIG. 6A, having four wing segments rather than five, having a varied vertical fin configuration, and having three hinge actuators rotated to allow the four wing segments to form a "W" shape.

FIG. 16A further depicts a hand-off of communications from one satellite to a second satellite.

DETAILED DESCRIPTION OF THE PREFERRED EMBODIMENTS

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but rather it is intended to serve as a particular example thereof.

Introduction to the Preferred Aircraft

In accordance with the present invention, the preferred embodiment of an aircraft of the present invention is of a design similar to that of the Pathfinder and Centurion aircraft, as mentioned above in the Background section. While the preferred aircraft embodiment's design, and variations of it, are described below, further details useful for the practicing of this invention are provided in U.S. Pat. No. 5,810,284, which is incorporated herein by reference. Nevertheless, it is to be understood that designs for other embodiments of the invention can include apparatus that differ substantially from the described aircraft.

The preferred embodiment is solar-powered, flying wing with fuel cells to store energy for continuous day and night flight. The aircraft includes a plurality of laterally connected, wing segments that each support their own weight in flight so as to minimize inter-segment loads, and thereby minimize required load bearing structure. In most variations of the preferred embodiment, the segments have elevators, but not ailerons or rudders, further limiting inter-segment loads. While these features are preferred, they are not required in all possible embodiments of the invention.

Figure 3:
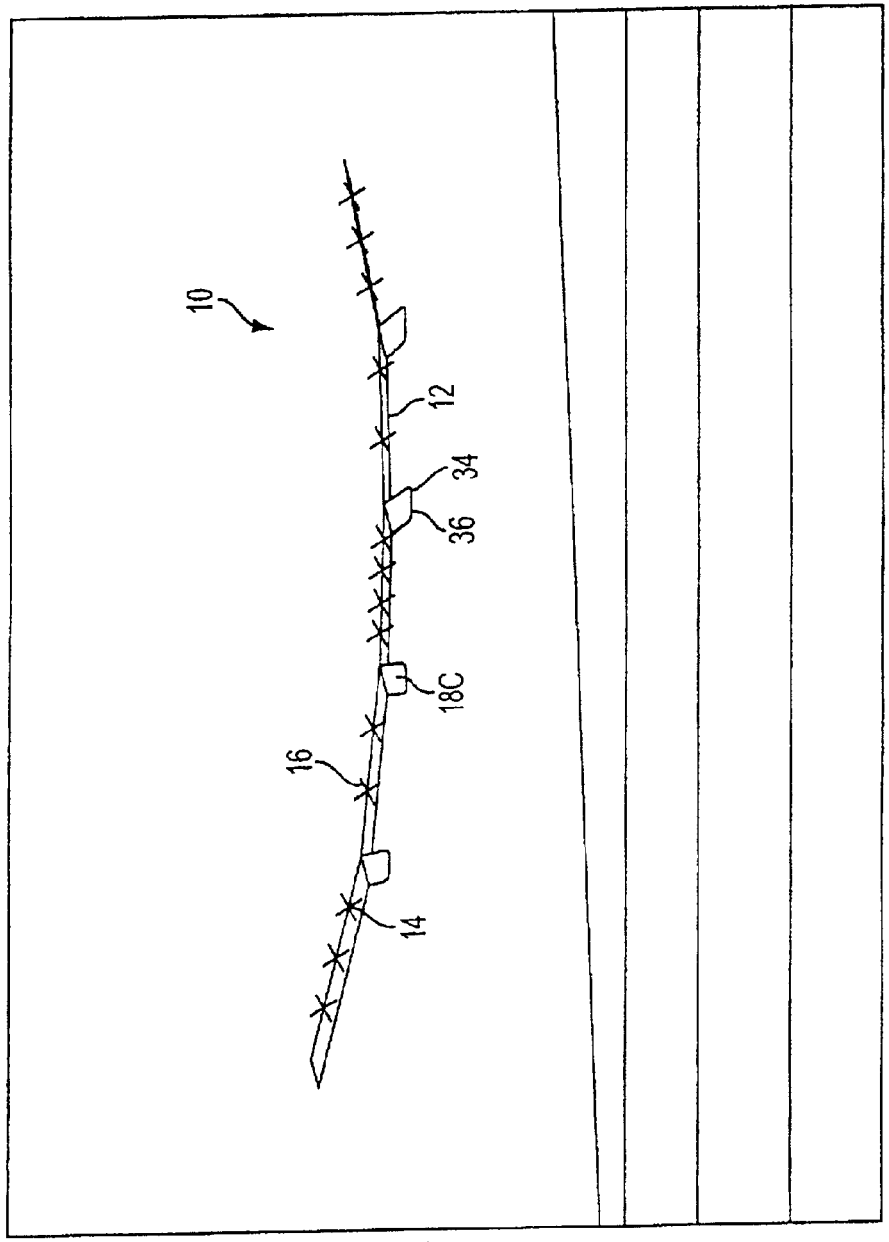
FIG. 3 is a perspective view of the aircraft depicted in FIG. 1, in a flexed position typical of loading under flight conditions.

With reference to FIGS. 1–3, the preferred embodiment is a flying wing aircraft 10, i.e., it has no fuselage or empennage. Instead, it consists of an unswept wing 12, having a substantially consistent airfoil shape and size along the wingspan. Preferably, six, eight or fourteen motors 14 are situated at various locations along the wingspan, each motor driving a single propeller 16 to create thrust. Preferably, two, four or five vertical fins 18a–18d, or pods, extend down from the wing, with landing gear at their lower ends.

The aircraft 10 is longitudinally divided into preferably five or six, modular segments sequentially located along the wingspan. These include a center segment 20, left and right intermediate segments 22, 24, and left and right wingtip segments 26, 28. These segments range from 39 to 43 feet in length, and have a chord length of approximately eight feet. Thus, the aircraft has length of approximately eight feet, and preferably has a wingspan of approximately 100, 120, 200 or 250 feet.

The center segment 20 has a middle airfoil portion 30, four motors 14 with propellers 16, left and right vertical fins 18b, 18c, and a solar array 32. The two intermediate segments 22, 24 of the aircraft 10 each have two propeller motors 14 and a solar array 32, but each have only a single fin 18a, 18d positioned at that segment's outer end, adjacent to the wingtip segments. Finally, the wingtip segments 26, 28 each mount three motors 14 with propellers 16 and one solar array 32.

The fins 18a–18d extend downward from the wing 12 at the connection points between segments, each fin mounting landing gear front and rear wheels 34, 36. The fins are configured as pods to contain elements of the aircraft, such as electronics, and/or various payloads. One of the pods, a "control pod" is used to carry control electronics, including an autopilot principally embodied as software, to control the motors and elevators. In addition, the pods carry sensors, including global positioning system ("GPS") equipment, as well as communications equipment, test equipment, surveillance equipment or a payload, depending upon the particular task for which the aircraft is configured.

The first embodiment is designed as a spanloader, with each of the segments designed to substantially support their own weight during flight, and thereby avoid significantly loading any other segment. This allows each segment to be quite flexible, and also allows the joints between the sections to include some flexibility having low stiffness (i.e., high flexibility) requirements allows the aircraft structure to be built at a minimum weight.

Preferably, there are no rudders or ailerons on the preferred embodiment of the aircraft 10, thereby further allowing the wing to be flexible. The only active control surfaces are elevators 38, which are situated along a large portion of the wing's trailing edge. In typical form, the elevators are actuated in tandem to change the aircraft's angle of attack. However, in other embodiments, some of the elevators could be configured for use as ailerons (i.e., configured as elevons).

The aircraft 10 controls yaw, and thereby turns, using differential thrust from varied motor torque on the propellers 16. Other known methods or mechanisms for creating differential thrust could also be used. The aircraft relies upon its large wingspan and small velocity to avoid yaw instability. Roll is controlled passively by the wing being configured with a positive angle of dihedral. The vertical fins 18a–18d, which extend beneath the wing 12, serve to prevent unwanted sideslip and dutch-roll during the aircraft's turns.

Figure 4:
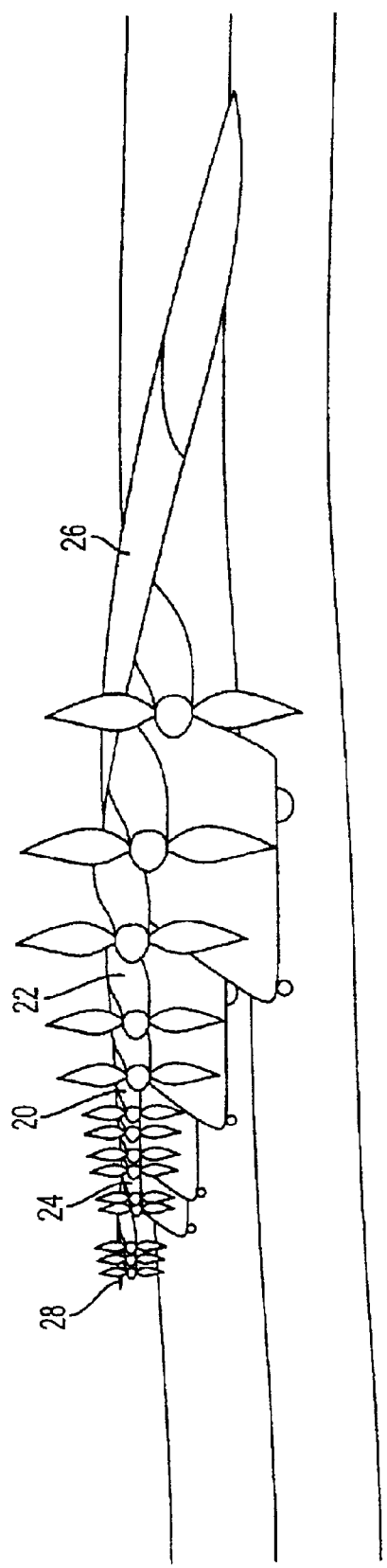
FIG. 4 is a perspective view of the aircraft depicted in FIG. 1, in a flexed position typical of loading while the aircraft is at rest on the ground.

FIG. 1 shows the preferred embodiment in an unstressed position, with the central and intermediate segments 20, 22 and 24 being relatively level and coplanar, and the tip segments 26, 28 having a natural 6 degree dihedral. The perspective view of FIG. 3 illustrates the natural curvature of the wing segments, as occurring during flight. This curvature causes an approximately 3 degree dihedral in the intermediate segments 22, 24, and an approximately 9 degree dihedral in the wingtip segments 26, 28, which provides the passive roll stability for the design, and eliminates the need for active roll control. FIG. 4, by contrast, shows a view of the preferred embodiment on the ground, with the wingtip segments bent downward by gravity. In either case, the center segment 20 is substantially symmetric about its centerline.

Figure 5A:
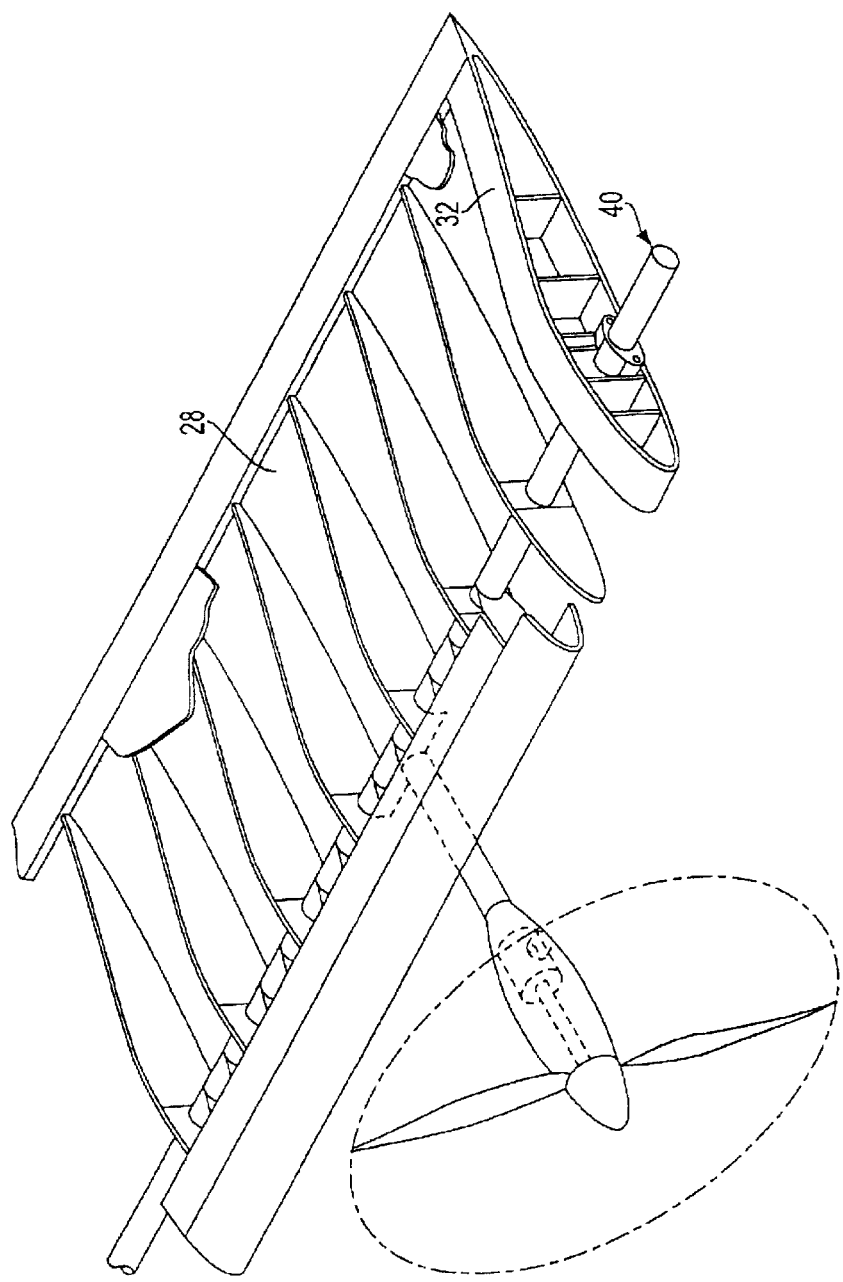
FIG. 5A is a perspective, cutaway view showing the construction of one segment of the wing of the aircraft depicted in of FIG. 1.

With reference to FIG. 5A, each of the five segments 20, 22, 24, 26 and 28 has a main spar 40 serving as its principal structural member. The main spar provides the primary structural connection to the other segments, carrying substantially all of the loads between the segments. The present aircraft 10 is unlike both conventional aircraft structures, and typical flying wings, which both use heavy main wing spars to support either a fuselage or a large central section (in the case of a flying wing) during flight. It does not include large central structures, such as a fuselage or empennage, and therefore does not require such a relatively strong spar to maintain the structural integrity and dynamic stability of the wing.

As a result of the above design, the preferred embodiment of the aircraft is light (less than 1 pound per square foot of wing area), travels at relatively slow air speeds (from 13 knots at low altitudes to 100 knots at high altitudes), and needs relatively little electrical power from the arrays of solar cells in order to stay airborne.

With reference again to FIGS. 1–3, the preferred embodiment of the invention derives its propulsion from the propellers 16, driven by the electric motors 14, which are run on electricity generated by the solar arrays 32. The aircraft preferably generates sufficient solar energy and contains sufficient energy storage capacity, to fly continuously, i.e., day and night. Preferably, it does so without polluting the environment, and without being encumbered by the weight of stored fuels, such as fossil fuels, for propulsion. Alternatively, it can be designed to derive some or all of its power from fossil fuels or other stored fuels, or combinations of fuel sources such as solar power by day and stored non-renewable or partially renewable fuels by night.

Since each of the five segments supports its own weight, and not the weight of a fuselage, the wing 12 is designed with a constant chord, rather than a tapered wingtip. This design permits even more solar cells to be mounted on the solar arrays 32 of the aircraft 10 than would otherwise be the case, and virtually the entire upper surface 42 of the wing is used for conversion of solar energy to electricity. Present day technology has produced some solar cells which exceed 20% in conversion efficiency, and it is expected that as the efficiency of solar cells increase, the required wingspan of the aircraft to support a given load will decrease. Present solar cells for a preferred embodiment include cells between 14.5% and 18.5%.

The preferred aircraft 10 is designed to be very power efficient and has a solar array 32 mounted proximate to each propeller's motor 14. It uses five solar arrays, one in each of its five segments, such that solar arrays occupy most of the upward surface 42 of the wing. The capacity of these arrays far exceeds the motors' instantaneous power requirements, so that more electrical energy than required by the propeller motors 14 is generated each daylight period.

To further improve power generation, the wing's skin is transparent on both the upper and lower surfaces, and the solar cells 32 are preferably two-sided. Thus, the solar arrays can generate electricity from light that is incident upon both the upper and lower surfaces of the wing. Additional power may thus be generated from light that is reflected off of the Earth.

With reference to FIGS. 5B and 5C, to provide power when sunlight is not available, e.g., at night, the aircraft 10 stores excess electrical energy in an energy storage system including multiple regenerative fuel cells 44, preferably based on fuel cell elements such as water, hydrogen and oxygen, aboard the aircraft. This energy is used to keep the aircraft continuously airborne. For the fuel cells, the spars 40 in the center segment 20 and the intermediate segments 22, 24 each hold hydrogen and oxygen gases in hermetically sealed tanks 46 within the spars. All three of these segments have a spar that is approximately twelve inches in diameter to contain the tanks. Unlike the middle three segments, the wing-tip segments 26, 28 do not have their own regenerative fuel cells, and they feature a main spar of reduced diameter. However, they can optionally be used for fuel cell gas storage. For example, given that the fuel cell produces twice as much hydrogen gas as oxygen gas from each unit of water, the outboard segments could be used for oxygen gas storage while the inboard segments could be used for hydrogen storage.

In addition to the main spars 40, the aircraft 10 also mounts a water tank 48 and other elements in close proximity to the spar at the interface between segments. Each regenerative fuel cell 44 requires a combination fuel cell/electrolizer 50, a water tank, thermal insulation 52, and a set of pumps and valves 54 to control storage and discharge of the fuel cell. During sunlight hours, surplus current from the solar arrays 32 is used to form hydrogen and oxygen gases from water. The gasses are produced at pressure, then stored in their respective tanks within the main spar. At night, electricity from the gases is derived by the fuel cell, which allows the gases to recombine using proton exchange membranes. The sole by-product, water, is pumped into the water tank and stored there for use in a subsequent energy storage cycle.

In the alternative, the preferred aircraft, being highly energy efficient, can be flown for extended periods of time by carrying stored fuels such as hydrogen for a fuel cell. Also, a combination of stored fuels and solar power technology can be used for extended flight.

The aircraft 10 is well suited for prolonged missions that require an aircraft to station-keep at a high altitude over a given location. Such missions include, for example, monitoring weather, providing a mobile, reusable communications platform, performing surveillance, testing atmospheric conditions, and other similar activities.

Features of the Aircraft

In order to carry out either the aforementioned missions or new missions, the aircraft must be able to derive as much power as possible from its daily exposure to the sun. Increased power generation allows for not only increased available power for the payload to use, but also for more motor thrust, and therefore a greater payload capacity. Furthermore, the aircraft must fly efficiently, and weigh as little as possible.

Aircraft embodying the present invention preferably include one or more of the following features to accomplish one or more of these ends.

Adjustable Dihedral

Figure 6A:
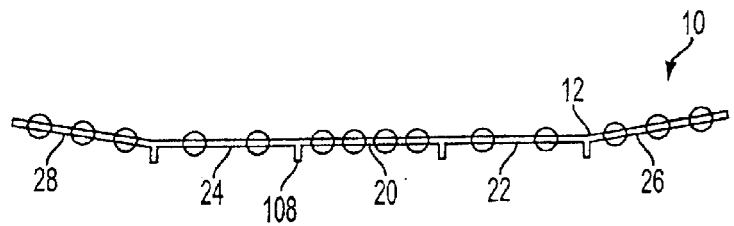
FIG. 6A is a front elevational view of the aircraft depicted in FIG. 1, having five wing segments, the aircraft being depicted in a position typical of loading while the aircraft is in flight.
Figure 6B:
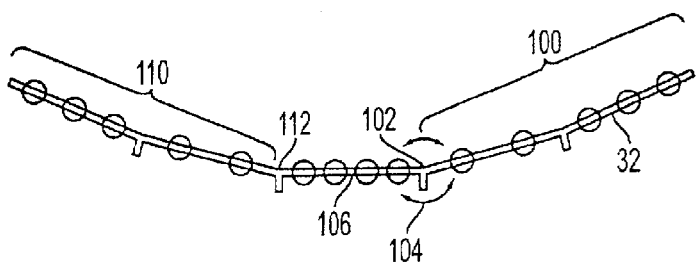
FIG. 6B is a front elevational view of the aircraft depicted in FIG. 6A, having two hinge actuators that have rotated to allow two wing segments on either side of the plane to increase in dihedral.

With reference to FIGS. 6A, 6B and 7, one feature of the aircraft 10 that provides for a significant increase in the power derived from the solar arrays 32 involves the use of adjustable wing dihedral. In particular, the wing 12 is configured with a first wing portion 100 that is connected to the remainder of the aircraft through a hinge mechanism 102 configured to allow the rotation of the first wing portion, around a rotational axis 104, with respect to a second wing portion on the remainder of the aircraft. In the embodiment depicted in FIG. 6B, the first wing portion includes the left intermediate segment 22 and left wingtip segment 26, while the second wing portion includes the center segment 20.

Preferably, the hinge mechanism 102 is configured to allow alteration of the dihedral without changing the sweep of the wing 12 to a significant degree. The hinge mechanism preferably limits the rotation of the first wing portion 100 to a value where the first wing portion can still generate enough lift to carry its own weight while the aircraft 10 is in flight. Also preferably, the hinge mechanism allows adequate rotation to develop enough dihedral to significantly increase the amount of electricity generated by the solar arrays 32 when the sun is located close to the level of the horizon with respect to the aircraft.

Figure 6C:
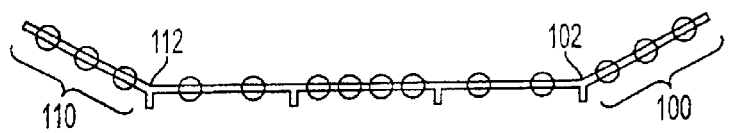
FIG. 6C is a front elevational view of the aircraft depicted in FIG. 6A, having two hinge actuators that have rotated to allow one wing segment on either side of the plane to increase in dihedral.

The aircraft 10 preferably features a hinge actuator configured to control the rotation of the hinge mechanism 102, thereby altering the dihedral of the first wing portion 100 with respect to the second wing portion 106. The hinge actuator is configured to deliver adequate torque to adjust the dihedral during flight. Preferably, a control system 108, located within one of the pods, is connected to the hinge actuator to cause the dihedral to be greater during time periods when the sun is close to the horizon with respect to the aircraft. Depending upon the heading of the aircraft with respect to the sun, the greater dihedral can cause a significant increase in power generation. As seen in FIG. 6C, when the sun is appropriately positioned off to one side of the plane, the lower surface of the wing on that side of the aircraft 114 can receive a substantial amount of incident light, while the upper surface of the wing on the opposite side of the aircraft 116 can receive a significant amount of light, even while some of the wing is shaded.

In order to optimize flight efficiency by reducing drag, the control system causes the dihedral to be less when the sun is high in the sky, or when it is night. This allows the aircraft to optimize the trade-off between power generation and flight efficiency. To accomplish this end, the control system determines a dihedral configuration to increase the power generated by the solar cells. This can be done by simply reading a clock signal and adjusting the dihedral based on the anticipated light conditions. More preferably, the control system can detect the light conditions, either through signals from light measurement devices, or from indications of the power levels generated by one or more of the solar cells.

Figure 7A:
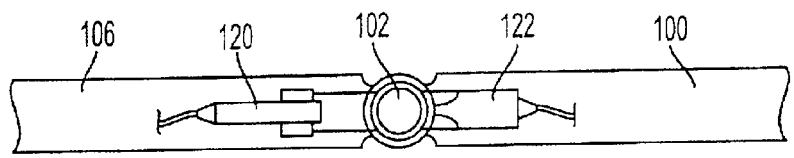
FIG. 7A is an elevational cross-sectional view of a hinge in the aircraft depicted in FIG. 6B.

As depicted in FIG. 7A, the hinge actuator preferably includes a hinge motor 120 configured to actuate the hinge mechanism 102 and thereby control the rotation of the first and second wing segments with respect to each other. The hinge actuator also preferably includes a rotational lock 122 for the hinge mechanism, which can be either within the hinge mechanism, or otherwise controlling it. When the rotational lock is in an unlocked configuration, the hinge actuator allows the rotation of the first wing portion 100 with respect to the second wing portion 106. However, when the rotational lock is in a locked configuration, the hinge mechanism is restrained, and the first wing portion is prevented from rotating with respect to the second wing portion, thereby maintaining the wing's dihedral configuration.

Figure 7C:
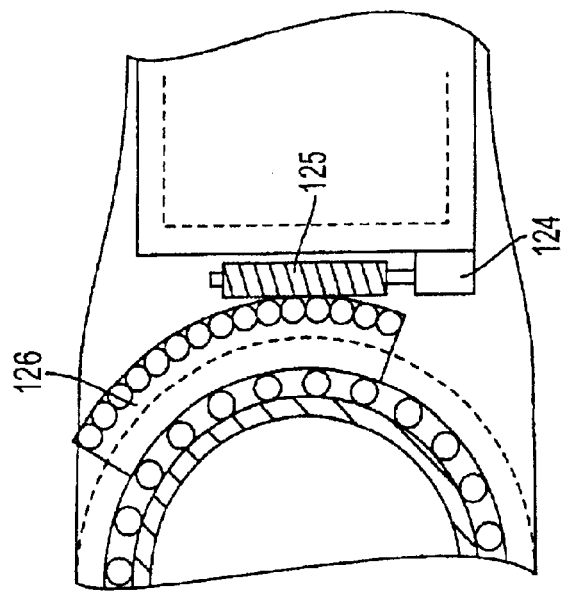
FIG. 7C is an elevational, cross-sectional view of a second variation of the hinge depicted in FIG. 7A.
Figure 7B:
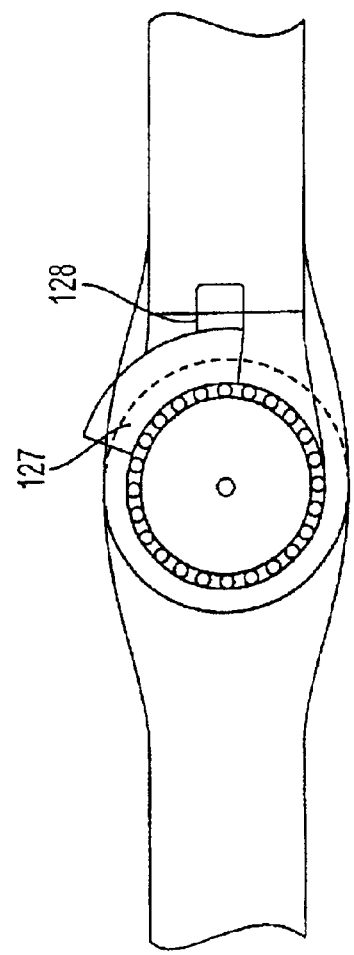
FIG. 7B is an elevational, cross-sectional view of a first variation of the hinge depicted in FIG. 7A.
Figure 7E:
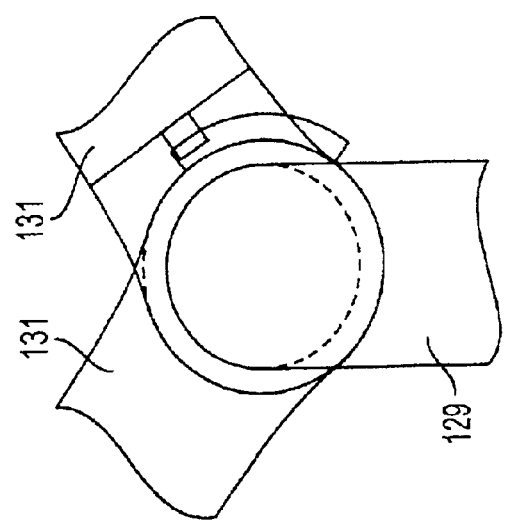
FIG. 7E is a plan view of the hinge depicted in FIG. 7D.
Figure 7D:
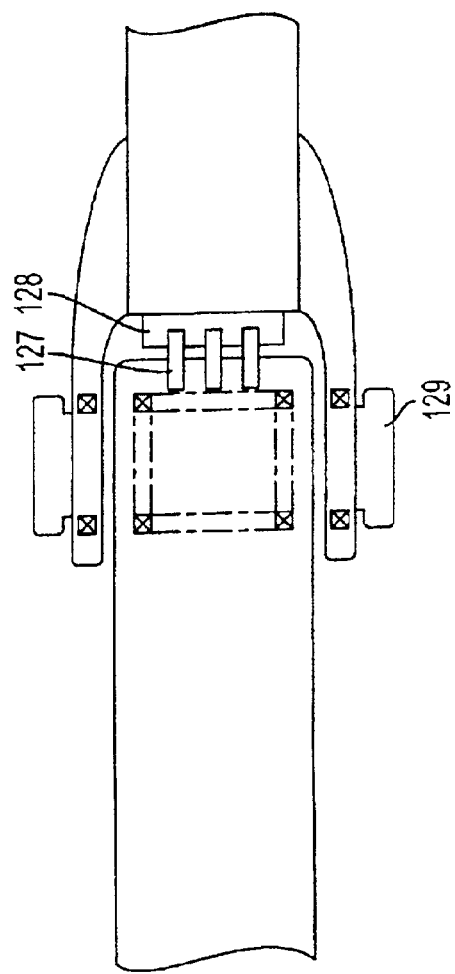
FIG. 7D is an elevational, cross-sectional view of a third variation of the hinge depicted in FIG. 7A, in a flexed position, and including an attachment for a fin.

A preferred hinge actuator can be designed with a motor 124 driving a pinion 125 enmeshed with a worm gear 126 (see the variation shown in FIGS. 7C). A preferred rotational lock can be designed with disks 127 and calipers 128 (see the variations shown in FIGS. 7B and 7D). In alternative embodiments of the aircraft some or all of the fins 129 can be mounted on the hinges, and optionally geared to require both wing segments 131 that are attached to the hinge to rotate by equal amounts relative to the fin (or by amounts of some other ratio or schema).

It is preferable that there be a symmetric arrangement of hinge mechanisms 102 on the aircraft 10. Therefore, the aircraft preferably has a third, symmetrically located wing portion 110 that connects to the remainder of the aircraft through a second, symmetrically located hinge mechanism 112.

Figure 6D:
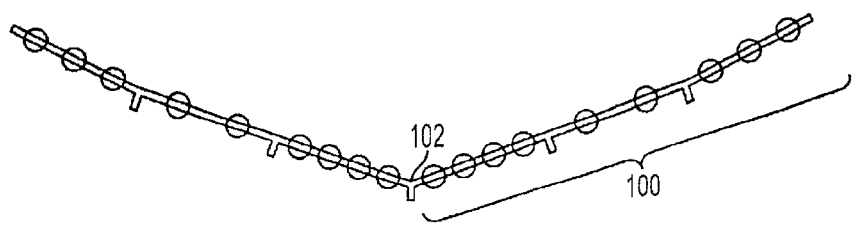
FIG. 6D is a front elevational view of the aircraft depicted in FIG. 6A, having six wing segments rather than five, and having one hinge actuator that has rotated to allow three wing segments on either side of the plane to increase in dihedral.
Figure 6E:
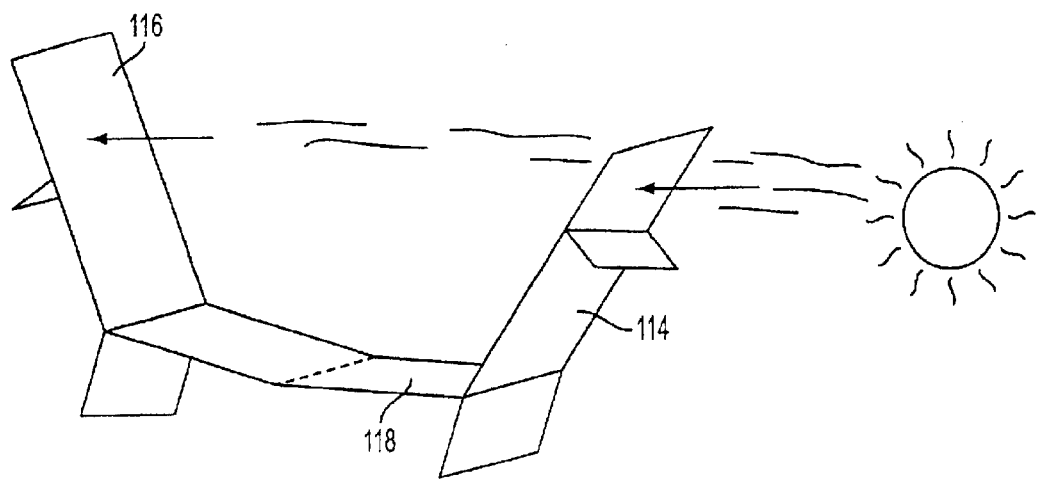
FIG. 6E is a perspective view of the aircraft depicted in FIG. 6B and the sun, wherein the sun is low on the horizon and off one wingtip of the aircraft.

While the preferred embodiment of the invention includes hinge mechanisms 102 between the center segment 20 and the intermediate segments 22, 24, they could also be located between the intermediate segments and the wingtip segments 26, 28, as depicted in FIG. 6D. Likewise, if the aircraft had an even number of segments, a single hinge mechanism could be used to adjust the dihedral, as depicted in FIG. 6E.

Additional configurations, such as aircraft configured to deflect into W-shapes or M-shapes are also within the scope of the invention. Such configurations having alternating positive negative dihedral can reduce wing loading. As depicted in FIG. 6F, an embodiment configured to fly in a W-shape preferably has an even number of wing segments.

Preferably vertical fins 115 are located near hinge mechanisms that flex upward to form a positive dihedral 113, such that the fins extend below the rest of the aircraft. Furthermore, fins are preferably not located near the hinges that flex downward 117 to form a negative dihedral. Other aircraft designs incorporating adjustable dihedral are also contemplated within the scope of the invention.

Figure 8:
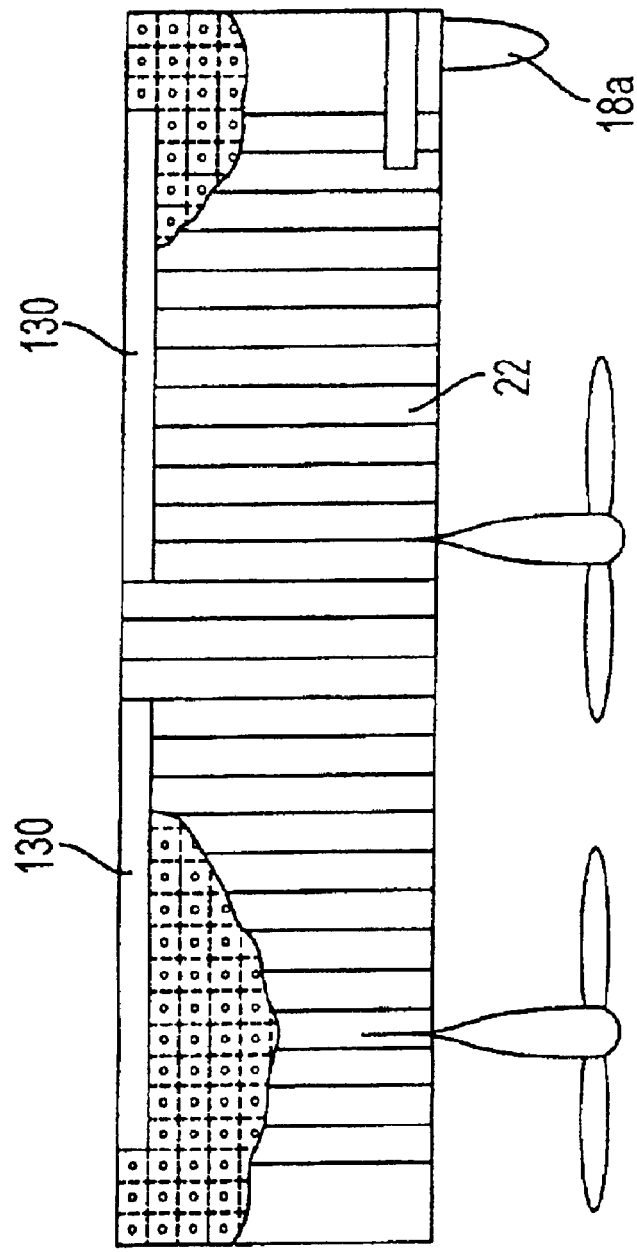
FIG. 8 is a top, cut-away view of one section of the wing from a first variation of the aircraft depicted in FIG. 6B, showing a hinge actuator that includes ailerons.

With reference to FIGS. 6B and 8, in a first variation of the preferred embodiment the hinge actuator is designed with control surfaces 130, such as ailerons or elevons, that are capable of producing the torque necessary to rotate the hinge mechanism 102 during flight conditions. These control surfaces can be the same surfaces used for normal controlled flight, or they can be control surfaces specially configured for hinge actuation. While this option does require the wing 12 to carry additional torsional loads generated by the control surfaces, it has the advantage of eliminating the weight of the hinge motors. An additional advantage of this system is that aircraft with typical flight computers will already be configured to have the computers control the existing control surfaces, and thus the flight computer can serve as the control system.

Figure 9:
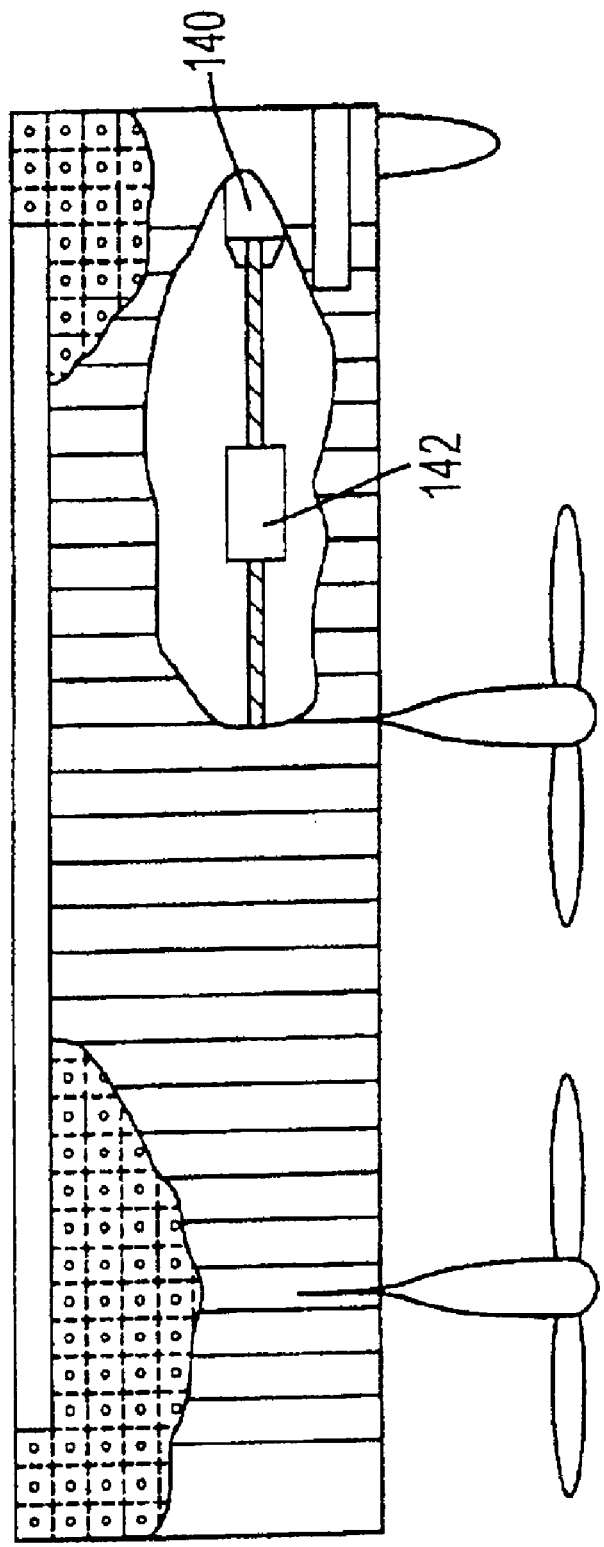
FIG. 9 is a top, cut-away view of one section of the wing from a second variation of the aircraft depicted in FIG. 6B, showing a hinge actuator that includes a laterally movable mass.

With reference to FIG. 9, in a second variation of the invention the hinge actuator is designed with a mass actuator 140 configured to laterally (i.e., span-wise) translate the center of gravity (CG) of a mass 142 that is carried by the first wing portion 100 to be rotated. The lateral movement of the mass' CG changes the CG of the first wing portion, and thereby drives the rotation of the hinge mechanism 102 when the wing is in flight conditions. In particular, the mass is moved such that the CG of the first wing portion is located in a position, relative to the center of lift of the first wing portion, so as to cause a torque on the first wing portion.

Naturally, other forces and torques applied to the first wing portion must be considered when attempting to analyze this actuation. Other variations of the invention could involve the mass being placed on portions of the aircraft other than the first wing portion to be rotated, so long as the moving of the mass' CG causes a torque that rotates the hinge mechanism.

Figure 10:
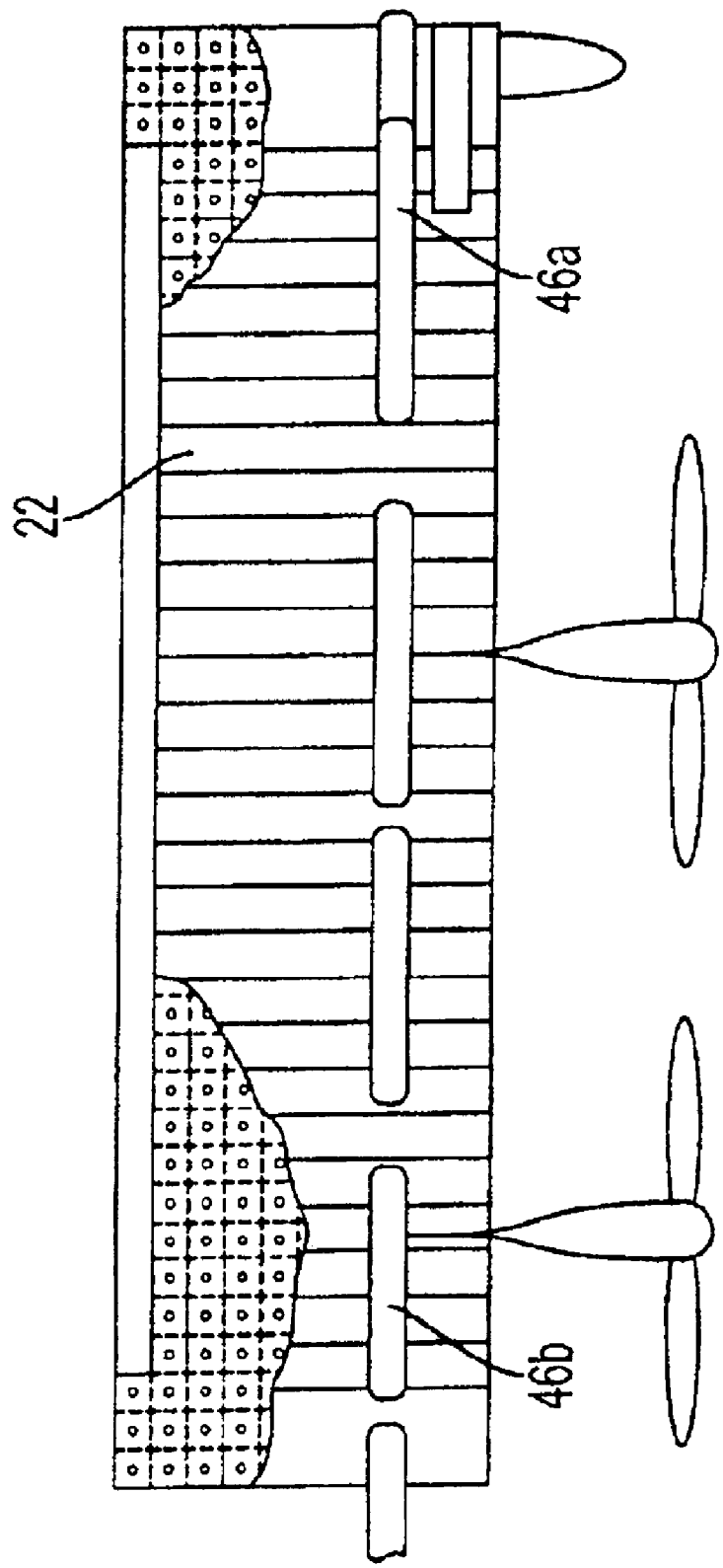
FIG. 10 is a top, cut-away view of one section of the wing from an alternative second variation of the aircraft depicted in FIG. 6B, showing tanks used for lateral mass movement.

While FIG. 9 depicts the mass 142 moving along a rotationally driven screw 144, other actuators capable of moving a mass are within the scope of the invention. Furthermore, the mass can be an element designed solely for this purpose, or it can be a mass that serves some other purpose, such as a structural element or part of the payload. For example, with reference to FIG. 10, the fuel cell elements, which are stored in tanks and spars, can be pumped between storage containers to move their CG laterally. In particular, by pumping hydrogen, oxygen, and/or water from sealed spar-tank 46a to sealed spar-tank 46b, the CG of the battery components can be moved laterally. Naturally, for this variation to work there needs to be appropriately located storage tanks, or dividers within the storage spars, as well as appropriately configured battery system pumps to provide the ability to move the CG of the components. When the control system is configured to control the pumping, it needs to account for the various states of the elements (i.e., whether they are combined as water, or separated as hydrogen and oxygen gas). Furthermore, because the fuel cell will either be charging or discharging the majority of the time, functioning of the fuel cell itself can be used as a pump to relocate the mass. In addition, depending on the configuration of the aircraft, gravity may be used to feed fuel cell elements (or other masses) from one location to another. Thus, using this variation, the battery's control mechanisms can serve as a mass actuator to move the CG of the battery elements.

Figure 11:
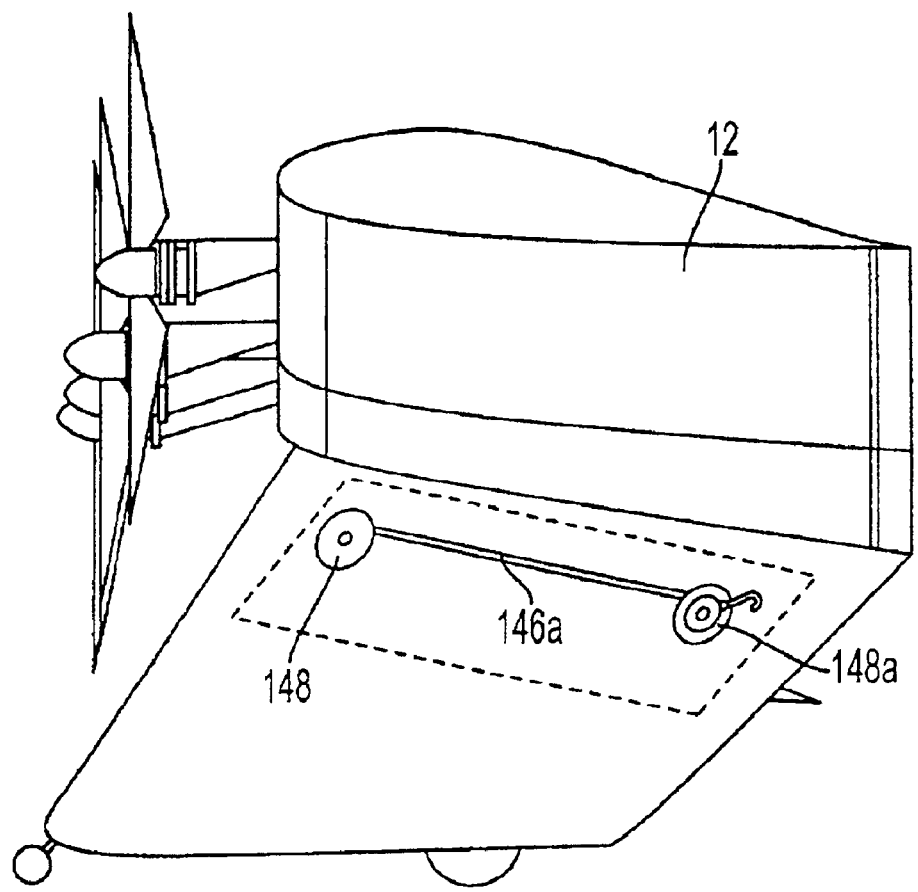
FIG. 11 is a side cross-sectional view of a third variation of the aircraft depicted in FIG. 5B, showing a hinge actuator that includes a mass moveable in the fore and aft direction.
Figure 12A:
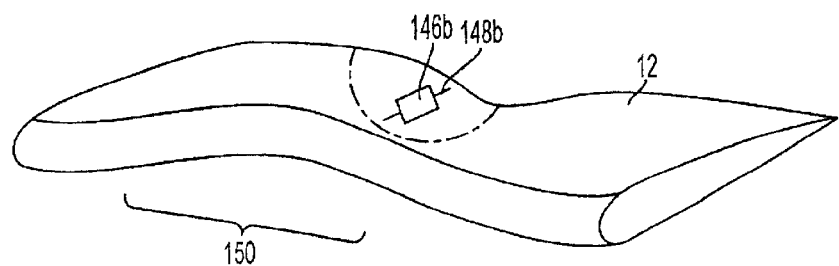
FIG. 12A is a perspective cross-sectional view of an alternate third variation of the aircraft depicted in FIG. 6B, showing an hinge actuator that includes a mass moveable in the fore and aft direction, and showing a local area wing deflection resulting from the moving mass.

With reference to FIGS. 11 and 12A, a third variation of the preferred embodiment has similarities to the second variation. In the hinge actuator of this variation, a mass is translated such that its CG moves fore and/or aft. The mass can be located within the wing 12 (as depicted in FIG. 12A), or within some other aircraft component, such as the fin 18a (as depicted in FIG. 11). While the mass and its actuator can be in many forms, the particular mass depicted in FIG. 11 is a cable 146a that is moved between two spinning reels 148a, and the mass depicted in FIG. 12A is a cylinder 146b riding on a screw 148b.

The movement of the mass affects the CG of a local area within the wing around the mass, causing the local area's CG to shift relative to the center of lift of the local area. The effect of this fore/aft CG shift is cause a torque in the local area around the mass, from the forces of gravity and lift.

In this variation, the wing 12 is torsionally flexible enough to significantly respond to the torque, and the structure of the local area 150 around the mass 146 changes shape, as shown in FIG. 12A. In the shape change, the local area around the mass effectively pitches up or down, relative to the rest of the wing, in the direction of the torque. This controlled pitching up or down of the local area causes an increase or decrease in the lift generated in the local area, similar to the actuation of a control surface. This change in lift is an aerodynamic force that in turn applies torque to the hinge mechanism. Thus, the mass and mass actuator can function as a hinge actuator by changing the shape of the wing.

Figure 12B:
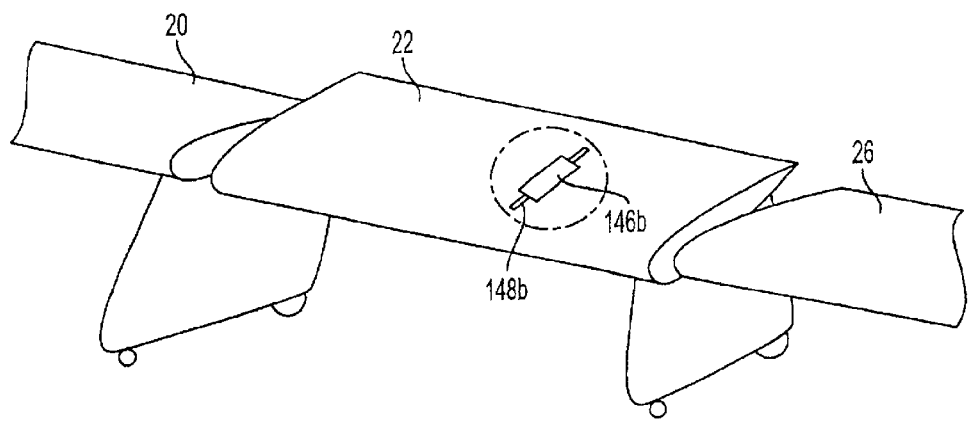
FIG. 12B is a perspective cross-sectional view of another alternative third variation of the aircraft depicted in FIG. 6B, showing an hinge actuator that includes a mass moveable in the fore and aft directions, and showing a wing segment deflecting from the moving mass.

Alternately, as depicted in FIG. 12B, in this variation the wing segments 20, 22, 24, 26 and 18 can be torsionally stiff relative to the connections between the wing segments, which provides for the wing segments to rotate relative to each other. In this case, the entire left intermediate segment 22 pitches up or down to provide the aerodynamic forces necessary to actuate the hinge mechanism. In some designs, both the wing segment and the connection between segments can flex to a degree allowing significant aerodynamic results.

In sum, the hinge actuator can be of a wide variety of designs both as a mass actuator and otherwise. Various actuators (e.g., linear actuators, motorized arm actuators, screw/gear actuators, pulley actuators, hydraulic actuators, gas pressure actuators, aerodynamic actuators such as tabs, and the like) are known for a variety of uses, and their potential use for the hinge actuator is contemplated within the scope of the invention. Furthermore, combinations of hinge actuators can be used where desirable. For example, the fourth embodiment of the invention, being the pitching of local areas within wing segments, can be employed to the extent allowed by wing torsion tolerances, and additional hinge actuation can be provided by a hinge motor.

Furthermore, while the described embodiments of active dihedral control are employed on an aircraft having numerous, flexible, non-swept segments of constant airfoil and chord, they can likewise be employed on other aircraft designs including conventional aircraft, and even biplanes.

The above mechanisms provide for a controlled dihedral that can be altered during flight. Under the control of a control system that is sensitive to the sun's position in the sky, such as by having a sun sensor or by having time and latitude information, the aircraft can adjust the wing's dihedral to optimize or improve the tradeoff between maximum solar power generation (i.e., by angling the cells toward the sun) and maximum wing efficiency (i.e., by minimizing dihedral to direct lift against gravity). Thus, the mechanism provides for a method of controlling the exposure of wing-mounted solar cells to sunlight at different times during the day.

Active Roll Control

A feature of the aircraft 10 that provides for increased flight control with efficient power utilization is the provision of active roll control without the use of active control surfaces (or with reduced reliance on active control surfaces for active roll control). In particular, using active roll control allows for controlled banking of the aircraft for efficient turning, and also allows for trimming out unwanted roll during normal flight.

Active roll control can be achieved using a mechanism similar to that described above for adjustable dihedral. In particular, the third variation of the preferred embodiment, above, includes a mass actuator 148b configured to move the CG of a mass 146b in a fore and/or aft direction, as depicted in either of FIGS. 12A and 12B. A portion of a flexible wing 12 (either the local area around the mass or the entire wing segment) is configured to be pitched up and/or down by the moving CG, thereby causing an aileron-like variation in lift. Notably, this aileron-like action occurs without significantly changing the designed shape of the wing's airfoil, such as the deflection of an aileron would. This feature of the invention can be combined with a hinge mechanism to provide for both active roll control and adjustable dihedral.

Pitch Control

Just as the preferred embodiment of the present invention provides for an aircraft to be controlled without ailerons, it also can provide for an aircraft to be controlled without elevators. It is known that a rigid aircraft could theoretically control pitch if it had engines rigidly stationed above and below the aircraft's center of drag. However, vertical structures add weight without contributing to lift, particularly when they must both carry the weight of an engine and deliver its thrust to the rest of the aircraft. Therefore, structures such as engine pylons are designed as compactly as possible.

Figure 13:
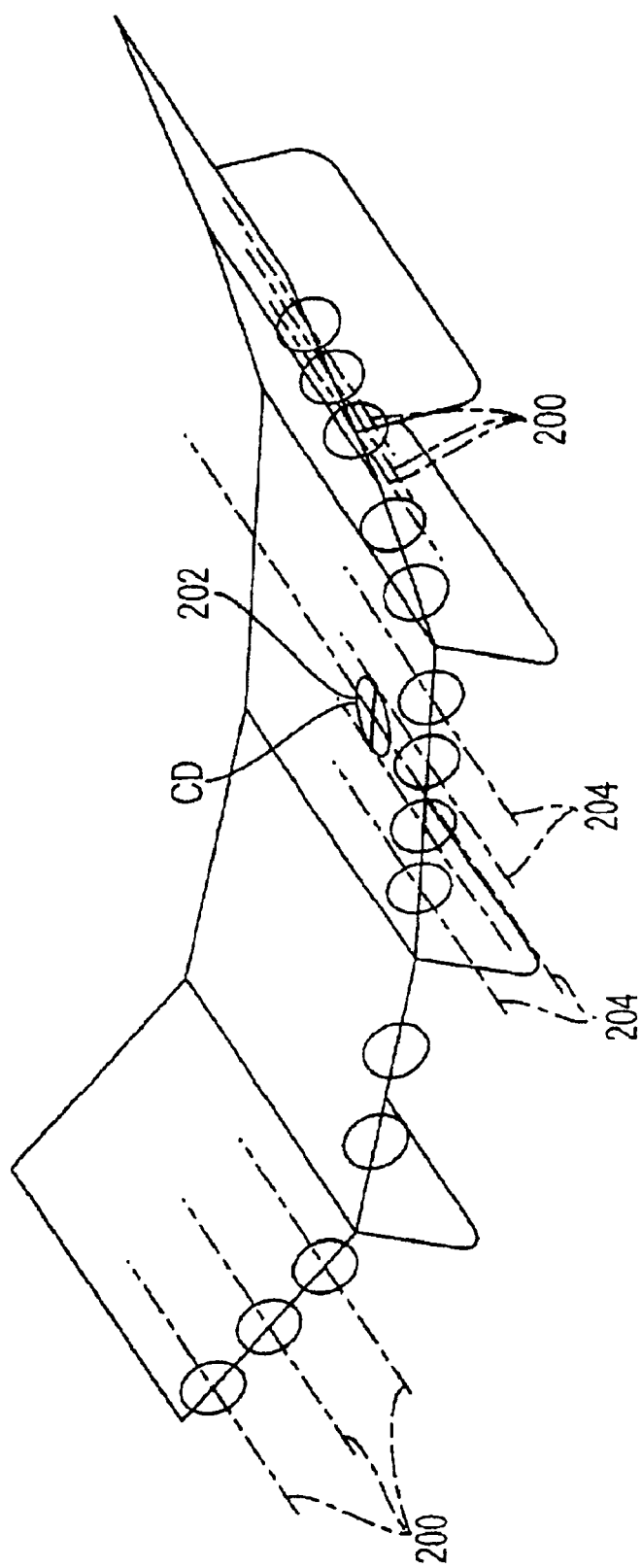
FIG. 13 is a perspective view of a variation of the aircraft depicted in FIG. 1, in a position typical of loading while the aircraft is in flight, configured such that some motors are located above the center of drag, and some motors are located below the center of drag.

In the various embodiments described above, the laterally extending flexible wing typically develops a significant dihedral angle, even without the addition of dihedral from the hinge mechanism. With reference to FIG. 13, the present invention includes a laterally extending wing 12 configured to have significant dihedral during flight due to the wings flexibility rather than due to rigid structural design.

Each of the aircraft's motors 14 have a throttle to control the motor's thrust. The dihedral of the wing causes one or more of the motors to produce thrust along a line 200 passing above the aircraft's center of drag 202 during typical flight conditions, thereby causing a downward pitching moment. Furthermore, the dihedral causes at least one motor to produce thrust along a line 204 passing below the aircraft's center of drag when the aircraft is in typical flight conditions, thereby causing an upward pitching moment.

The aircraft also includes a control system configured to control each motor's throttle, the control system being configured to control the throttles such that a controlled pitching moment is applied to the aircraft. In particular, the control system increases the throttle for the motors having a line of thrust 200 above the aircraft's center of drag 202, and decreases the throttles of the motors having a line of thrust 204 passing below the aircraft's center of drag, to cause a downward-pitching moment when such a pitching moment is called for. The change in thrust may be reversed to create an upward-pitching moment. Preferably, the control system and motors are configured with a symmetry that allows the pitching moment to be applied without causing undue torque (i.e., the left side is a mirror image of the right side).

Additionally, more limited throttle control can be used to produce some pitch control. For example, the motor or motors producing thrust along the line below the aircraft's central drag may be left with a constant level of thrust, while the motor or motors creating thrust above the aircraft's center of drag may be controlled to produce an upward or a downward pitching moment.

By forgoing active control surfaces such as elevators, the parts count, cost and weight of the aircraft are reduced, while the CG of the aircraft is likely favorably affected (i.e., moved forward along the wing). The reduced number of moving parts provides for increased system reliability. The use of differential thrust provides for quick response time. For example, differential thrust avoids the effect of elevator slew time. This is particularly true for aircraft having high dihedral angles, either natural, or those produced under flight loads.

Full Aircraft Control Without the Requirement of Control Surfaces

The above discussion of roll control is, in fact, a simplification of a broader concept within one aspect of the present invention. The idealization of an aircraft in flight, depicted in FIG. 14A, presents some of the more fundamental concepts of this aspect.

Figure 14A:
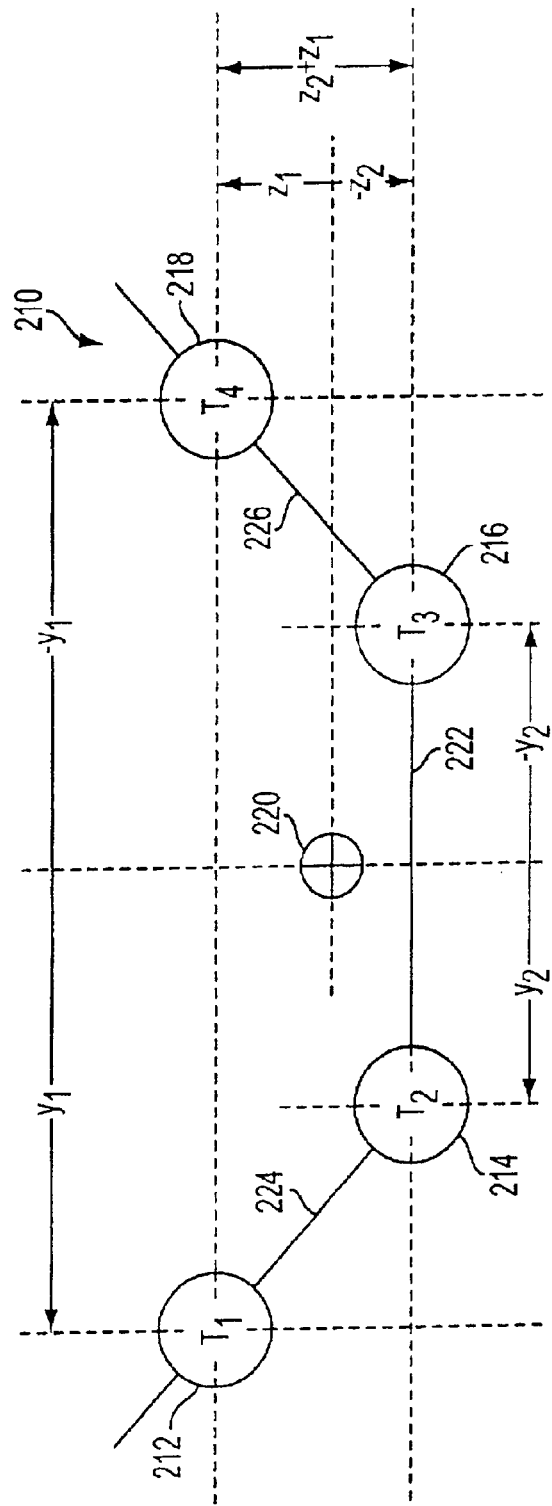
FIG. 14A is an illustration of a first idealized flexible aircraft having three axis flight control, according to the present invention.

FIG. 14A is an idealization of a flexible aircraft 210 having four engines 212, 214, 216 and 218, which will be referred to by their drawing reference numerals, and which produce thrust levels of $T_1$, $T_2$, $T_3$ and $T_4$, respectively. In a coordinate system based at the aircraft's center of drag 220, the engines are located at distances $y_1$, $y_2$, $z_1$, and $z_2$ from the center of drag, as depicted in the figure, on the x=0 plane, and produce thrust in the positive x direction. Preferably, the wing's dihedral is formed principally by flexibility rather than on a heavy, rigid structure. Each engine's line of thrust passes directly through the wing spar (i.e., the principal axis of torsion). The aircraft has significant torsional flexibility in a center section 222.

Yawing and pitching of the aircraft 210 can be achieved through torques developed by differential thrust. In particular, increasing $T_2$ and $T_3$, while decreasing $T_1$ and $T_4$ by a like amount causes a nose up (−y) pitching torque while maintaining the overall thrust, rolling torque and yawing torque. Likewise, increasing $T_3$ and $T_4$, while decreasing $T_1$ and $T_4$ by a like amount causes a leftward (+z) yawing torque while maintaining thrust, pitch torque and roll torque.

Rolling of the aircraft 210 can be achieved through a torsion of the center section 222. In particular, increasing $T_2$ and $T_4$, while decreasing $T_1$ and $T_3$ by a like amount causes an upward (−y) pitching torque on the left side 224 of the aircraft, and a downward (+y) pitching torque on the right side 226 of the aircraft, while maintaining the overall thrust, pitching torque and yawing torque. Because of the differing pitching torques between the right and left sides of the aircraft, the right and left sides pitch down and up, respectively, with the center section twisting in torsion to accommodate them.

Because the left side 224 has pitched up, it has a greater angle of attack, and therefore has both increased lift and a portion of the thrust vector pointing in an upward direction. Likewise, because the right side 226 has pitched down, it has a lower angle of attack, and therefore has both decreased lift and a portion of the thrust vector pointing in a downward direction. With this differential in vertical forces, the aircraft has a right rolling (+x) roll torque. The opposite roll torque can be achieved by reversing the increases and decreases in thrust.

Given the geometry of the aircraft 210, the net thrust, yawing torque, pitching torque and center section 222 twisting torque can be calculated by a person skilled in the art as follows:

| | |
|---|---|
| Net thrust | $T_1 + T_2 + T_3 + T_4$ |
| Yawing Torque | $(T_1 - T_4)y_1 + (T_2 - T_3)y_2$ |
| Pitching Torque | $(T_1 + T_4)z_1 + (T_2 + T_3)z_2$ |
| Midsection Twisting Torque (Yielding wing tips at different angles of attack) | $(T_1 - T_4)(z_1 + z_2)$ |

Partitioning these equations out in matrix form yields control laws for the four engine thrust levels as a function of total thrust, yaw torque, pitch torque and (center section) twist torque, as follows:

$$\begin{bmatrix} T_1 \\ T_2 \\ T_3 \\ T_4 \end{bmatrix} = \begin{bmatrix} 1 & 1 & 1 & 1 \\ y_1 & y_2 & -y_2 & -y_1 \\ z_1 & -z_2 & -z_2 & z_1 \\ z_1+z_2 & 0 & 0 & z_1+z_2 \end{bmatrix}^{-1} \begin{bmatrix} \text{Thrust} \\ \text{Yaw Torque} \\ \text{Pitch Torque} \\ \text{Twist Torque} \end{bmatrix}$$

Given the aerodynamics of the aircraft 210 and the torsional stiffness of the center section 222, it is within the skill in the art to calculate or approximate the roll torque developed from a given twist torque on the center section. Depending on the amount of deflection and the aerodynamics, the roll torque might not be linearly related to the center section's twist torque. Nevertheless, with the relationship between the (center section) twist torque and the roll torque established, the twist torque can be stated (or estimated) as a $\tau$ function of roll torque: $\tau$(Roll Torque). Substituting this into the above control laws provides a calculation of thrust levels required to meet a set of thrust, pitch, roll and yaw flight requirements, as might be received by a flight computer.

Figure 14B:
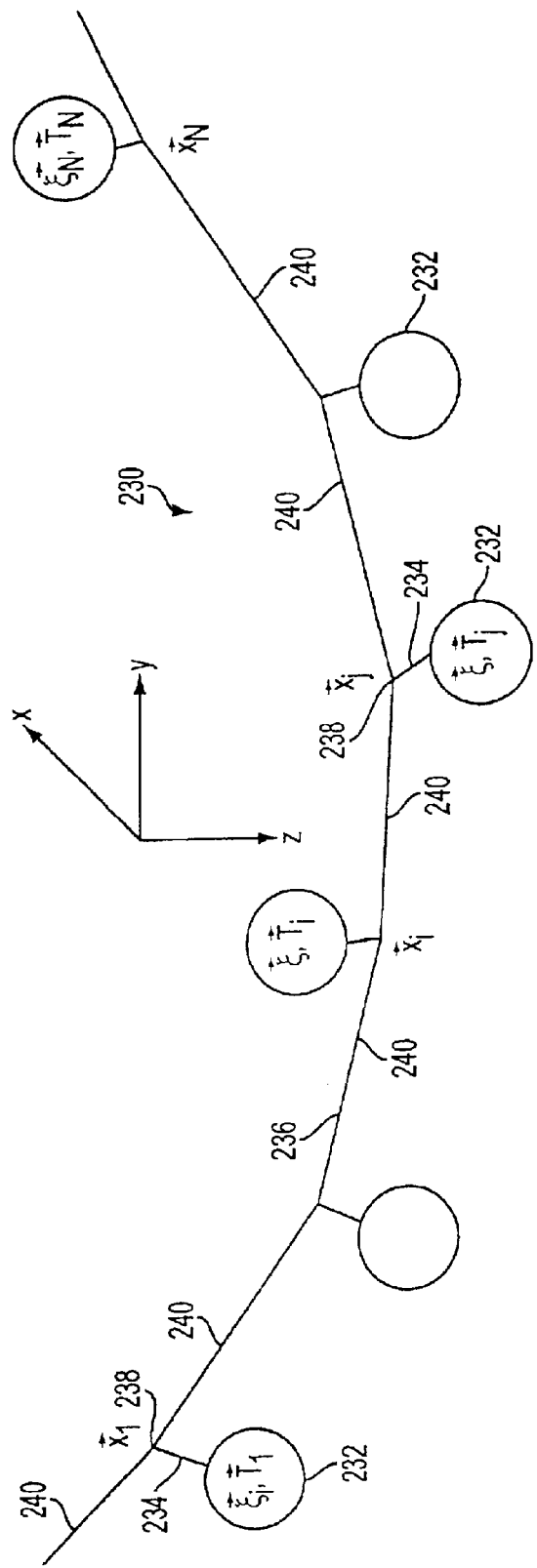
FIG. 14B is an illustration of a second, and more general, idealized flexible aircraft having three axis flight control, according to the present invention.

With reference to FIG. 14B, the above idealization of a flexible aircraft within the scope of the invention can be further generalized to a flexible aircraft 230 having n engines 232 carried by pylons 234 on a torsionally flexible wing 236. For each engine i (i=1 to n), there is a pylon mount 238 position vector $X_i$, a thrust location vector $E_i$, and a thrust vector $I_i$, as well as geometry, stiffness and aerodynamic information for each section 240 of the wing, where each section extends between consecutive engines.

Similar to the calculations done for the idealization depicted in FIG. 14A, the thrust vectors may be summed (now in all three directions) to yield net thrust, yaw torque, pitch torque, and twist torque throughout each portion of the wing. Because the engine thrust is not necessarily in the x direction, there are also net y and z forces to consider. Partitioning this in matrix form, the control law equations can be solved for the magnitudes of each $T_i$, the engine thrust levels.

As before for the aircraft depicted in FIG. 14A, given the aerodynamics of the aircraft 230 and the torsional stiffness of each section of the wing 236, it is within the skill in the art to calculate or approximate the roll torque developed from a given twist torque $\tau_k$ on the each section k. With the relationship between the twist torques $\tau_k$ and the roll torque established, the twist torque can be stated (or estimated) as a function of roll torque: $\tau_k$(Roll Torque). Substituting this into the above described control laws for the thrust magnitudes provides a calculation of thrust levels required to meet a set of flight requirements, including thrust, pitch, roll, and yaw, (along with vertical motion and side slip) as might be received by a flight computer.

Figure 14C:
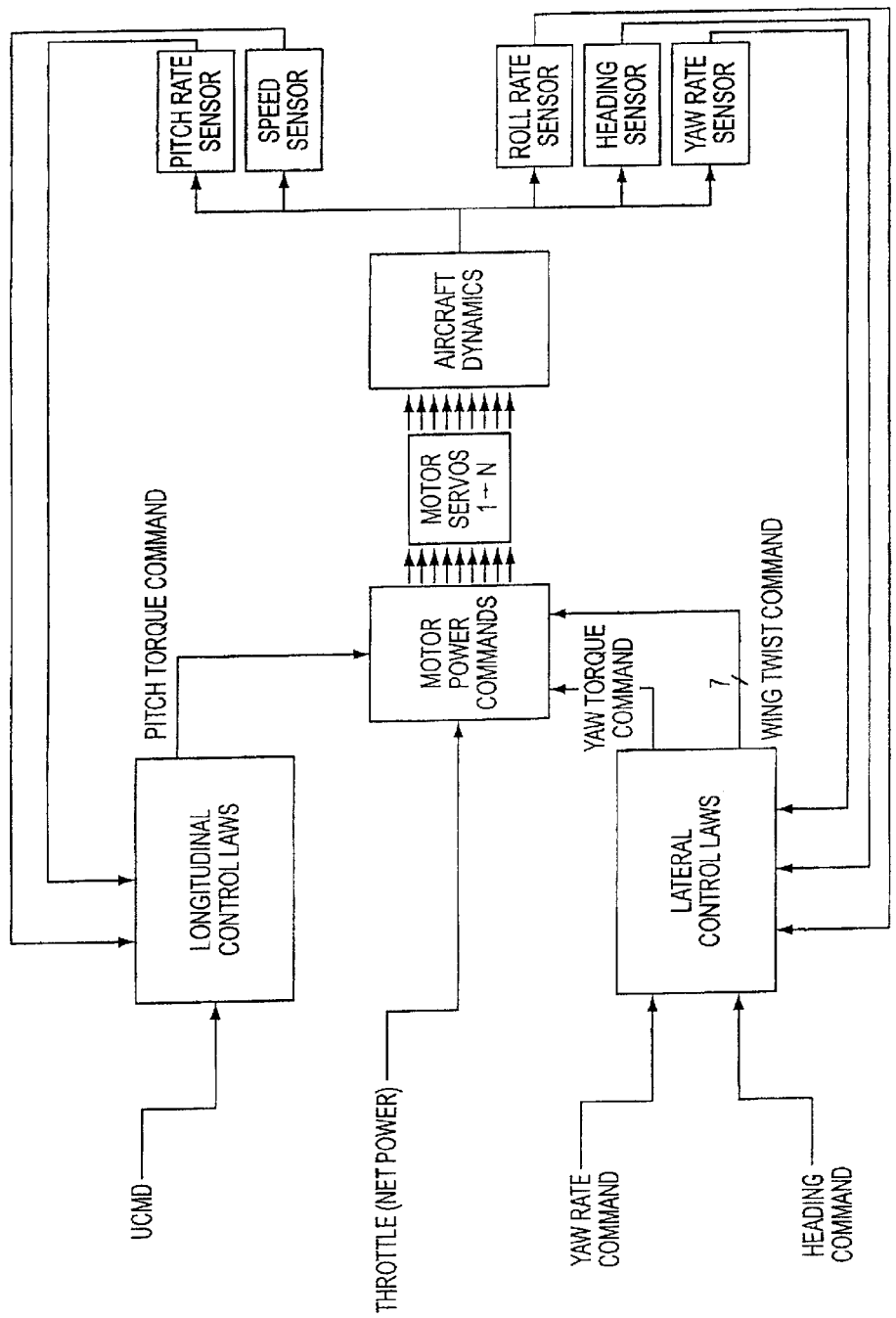
FIG. 14C is a block diagram of a control system implementing control laws form the aircraft illustrated in FIG. 14B.

The above control laws can be implemented by a control system embodying the control block diagram depicted in FIG. 14C. The block diagram further considers the well known relationships between roll, yaw and heading, and between pitch and airspeed.

The description of the invention, provided with reference to FIG. 14B, can be further extended by adding the use of movable masses to further cause wing deformations. This type of procedure was described above in the sections entitled "Adjustable Dihedral" and "Active Roll control." To analyze the aircraft of FIG. 14B, with the further addition of movable masses, each wing section 240 containing a movable mass can be considered a plurality of wing sections that are separated by the movable masses. The deflection of each movable mass j can be quantized by a mass movement magnitude $M_j$, and equations can be formed relating each movement $M_j$ with a resulting twisting torque $T_j$. These equations are combined with the thrust equations, above, and solved for a matrix containing the engine thrust levels $T_i$ and the mass movement magnitudes $M_j$. This matrix equation forms the control laws for a control system, similar to that described above in FIG. 14C, with the addition of mass movement commands and servos.

In sum, using this aspect of the present invention, fill aircraft control can be maintained without the requirement of active control surfaces as they are typically known. Flexible aircraft deformation can be achieved through the use of differential thrust and/or by the use of variable structural properties, such as mass. It is noteworthy here that a variable stiffness such as could be achieved using tubes of liquid pressurized to varying levels, could also serve a similar function.

Unmanned Control From a Distance

Depending on the form of control system within an unmanned aircraft, it will typically need to be controlled by skilled pilots, technicians, or other types of mission-control specialists. Typical radio-control is generally limited to 400 mile line-of-sight operations. Control of the above-described aircraft, or indeed any unmanned aircraft, frequently could need to be done from around obstacles and/or at distances greater than can be maintained through typical radio-signal control. This is of particular significance to commercial or military operators that wish to control a large fleet of high-altitude, long-endurance aircraft using a limited pool of skilled mission controllers.

A dedicated network of satellites or other communication equipment provides one solution to the problem of long range control. However, this solution is very expensive, and can be subject to point failures in the network.

The present invention provides a control communication system for highly reliable control over the above unmanned aircraft, or any aircraft, at significantly lower cost than a dedicated control system. Indeed, this aspect of the present invention has the potential for applications far outside the relevant art of aircraft inventions, and it could be used for communication and/or control in a wide variety of situations.

Most parts of the world are interconnected through a wide variety of competing and complementary communication systems such as the Internet, land line telephone networks (leased or public), terrestrial wireless networks, cable modem networks, air phone networks, satellite networks, and other such systems. Such networks are themselves complex systems, and many are designed to provide on the order of 99.99% reliability, reliability being defined as the probability that the system is working during its lifetime. Nevertheless, any one of these systems is not likely to provide the preferred level of reliability to operate the aircraft.

In this aspect of the present invention, adequate reliability is maintained by using a plurality of partially, substantially or (most preferably) fully redundant communication paths, (i.e., redundant communication subsystems, to transmit and/or receive signals between the mission controller and the aircraft). Preferably, the invention includes a controller that controls the use of a first, primary communications subsystem and a second, alternate communications subsystem, each typically made from a plurality of system components. To be fully redundant, the subsystems can not share any critical link. Alternatively, the systems can be partially redundant, having only limited shared critical links that preferably exhibit higher than normal reliability, or are at least under the control of an entity having an interest in the aircraft.

Care must be taken to assure that seemingly different systems are not, in fact, sharing a common critical communications link. For example, one long distance telephone network might in fact lease lines from another network, and thus share a critical link. Therefore, it is best to select service providers that maintain their own communications backbone.

Typically, there will be three classes of subsystem components: backbone links (such as comprising fiberoptic networks, microwave transmission networks, satellite networks, coaxial cable networks, or copper wire networks), aircraft access links (such as radio links between the backbone links and the aircraft), and mission controller links (such as land phone lines, cell phone connections, microwave links or direct satellite links between the backbone and the mission controller).

Figure 15:
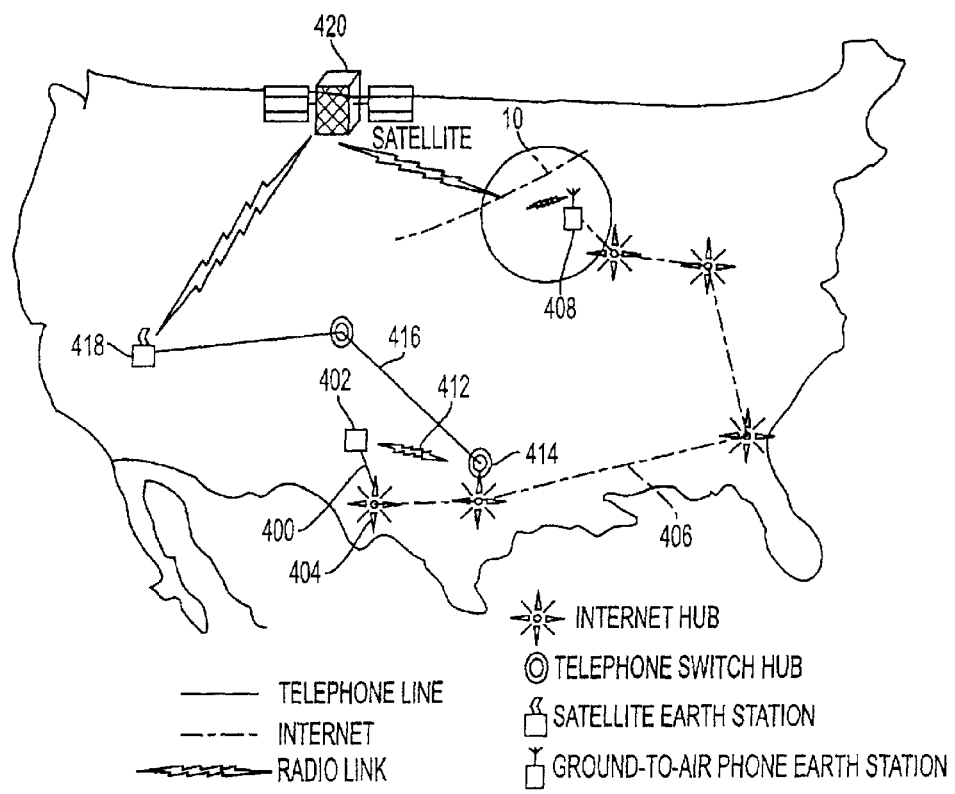
FIG. 15 is an illustrative view of an embodiment of an aircraft control communications system for the aircraft depicted in FIG. 1.

For example, as depicted in FIG. 15, a first communications subsystem could comprise a telephone link 400 from a pilot station 402 to an Internet gateway 404, which provides an Internet link 406 to a ground-to-air phone broadcast station 408 that broadcasts to the aircraft 10. A second communications subsystem could comprise a cell phone link 412 to a telephone switch hub 414 that connects with an independent telephone system 416, which delivers the control signal to a satellite ground station 418 that delivers the signal to a satellite network 420 that can directly communicate with the aircraft. Notably and preferably, there are no common links between the two communications subsystems, making them fully redundant.

When selecting system components, consideration should be made as to the extent of overlap with other systems. For example, the Internet is a decentralized network system that passes packets of information from a first location to a second location by any of a wide number of different paths using any of a wide variety of interconnected computer systems. It therefore has some inherent redundancy. The failure of any one computer system, or failures that are only regional, could affect traffic between one pair of locations significantly more than between another pair of locations. A given computer within the network might not be critical (i.e., reducing the subsystem's availability to a level that does not allow adequate control) to both communications subsystems. However, a system-wide failure of the Internet, however unlikely, could equally affect Internet communications along seemingly separate pathways (such as one extending along the eastern states and another along the western states). Thus, two communications subsystems which use the Internet through different portals are substantially, but not fully, redundant.

With the above consideration, the use of a single decentralized network for more than one communication subsystem, which is a non-critical overlap, is within the scope of the invention. Nevertheless, most preferably, the communications subsystems are entirely separate and distinct, i.e., fully redundant, having no overlap whatsoever.

Additional communication subsystems can also be actively maintained and/or monitored for availability. Indeed the controller preferably monitors the availability of a plurality of available communications subsystems, the controller preferably having access to reliability data on each such subsystem that it monitors. It preferably selects whether to actually establish these additional links, and the number of additional links to actively establish and/or monitor, based on the anticipated reliability of each system and the availability of the subsystem and/or its components.

The communication subsystems can be preselected, end-to-end communication paths, such as the ones described above, or they can be the much larger number of subsystems that can be constituted from a plurality of available system components. In the later case, each system component is preferably monitored for availability, while in the former case, arrangements could more easily be made to simply monitor the fill end-to-end functionality.

The overall reliability RS of the communications system of the invention, having N communication subsystems, can be calculated as:

$$RS = 1 - (1-R_{S1})*(1-R_{S2})* \ldots *(1-R_{SN})$$

where $R_{S1}, R_{S2} \ldots R_{SN}$, are the respective system reliabilities of each of the N communication subsystems. This reflects the fact that the system is functional so long as any one subsystem is working. The reliability of each such communication subsystem P, having I system components, can in turn be calculated as:

$$R_{SP} = R_{C1}*R_{C2}* \ldots *R_{CI}$$

where $R_{C1}, R_{C2} \ldots R_{CI}$ are the respective system reliabilities of each of the I system components. This reflects the fact that the subsystem fails if any component fails.

The controller preferably monitors the present status of communication between the mission controller and the aircraft. The controller preferably selects the communications subsystems to be used by considering calculations of the overall system reliabilities. The controller also preferably takes into consideration the various costs involved in using each communication subsystem, thus minimizing the overall cost of operating the communications system.

Advantageously, this communications system will typically provide the ability to communicate with an aircraft almost worldwide using primarily existing communications infrastructure, which will likely simplifies the deployment and relocation of aircraft systems. Existing system components typically have established communication frequencies, and generally have known reliability, providing for reduced startup and operational costs. The superior reliability of the components will likely lead to efficient aircraft control, which in turn can provide for reduced power requirements, thus leaving more power for use by an aircraft's payload.

Missions for the Aircraft

As noted above, the aircraft of the preferred embodiment is ideally suited for certain types of prolonged missions. These include monitoring weather, providing a mobile, reusable communications platform, performing surveillance, testing atmospheric conditions, and many other activities as well. For example, the preferred embodiment can be used for to high altitude weather surveillance, and have its course or flight pattern changed to follow a hurricane at high altitudes, where the aircraft is well out of danger.

The aircraft is designed to fly continuous, unmanned missions of 3000 hours, or longer, which is greater than the mean time between overhauls for most aircraft. Therefore, the aircraft is designed with reliability foremost in mind. This reliability is at least partially aided using redundancy, that is, by providing many back-up systems aboard the aircraft.

Satellite Downlink System

Figure 16A:
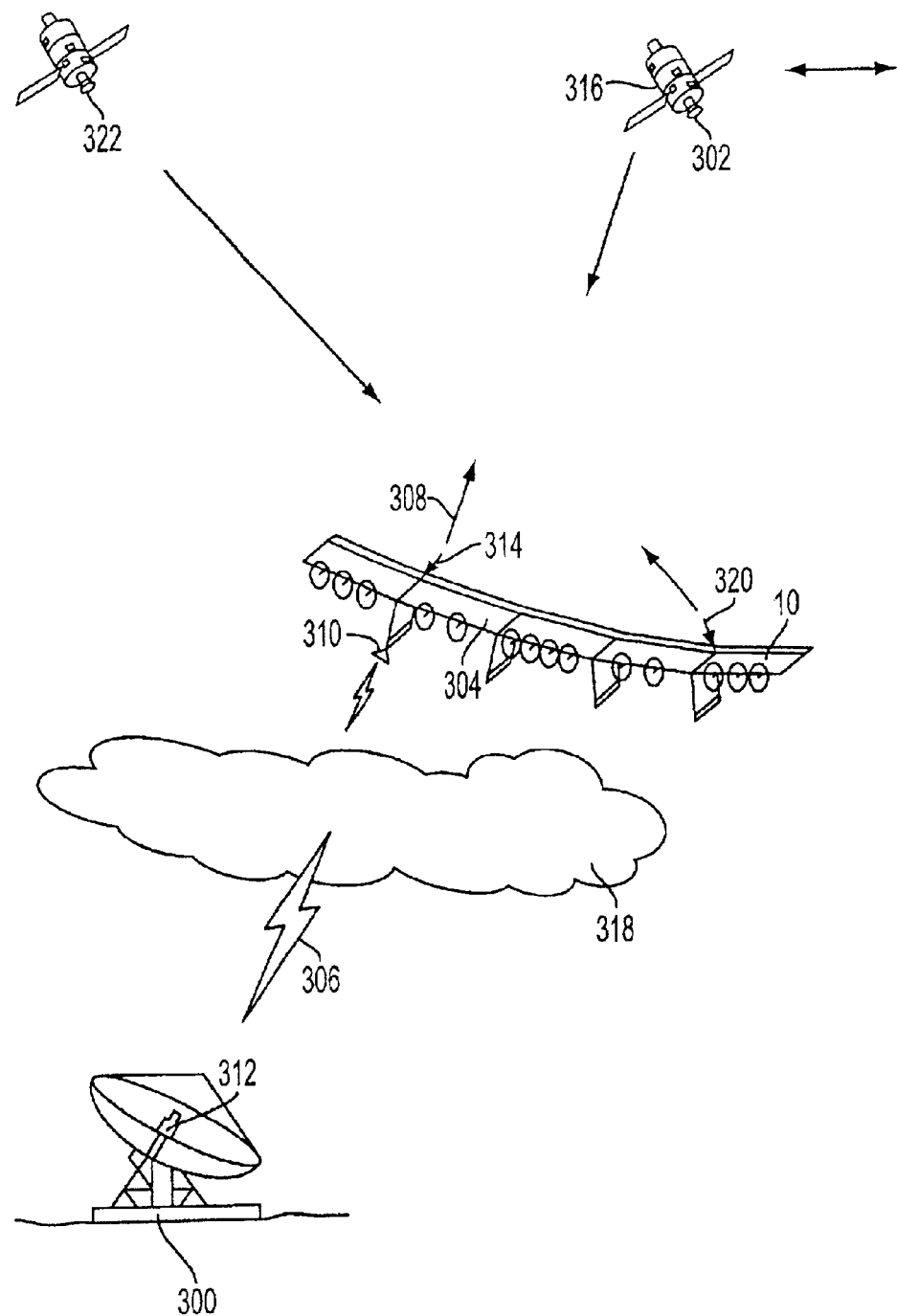
FIG. 16A is an illustrative view of the aircraft depicted in FIG. 1, acting as a high altitude platform in a communications system, to pass signals between a ground station using radio wave signals and a satellite using optical signals.

With reference to FIG. 16A, one type of mission, for which the aircraft 10 of the invention is well suited, is the establishment of high bandwidth ground to space communication system, from a spacecraft located at orbital altitudes or higher, such as a satellite, to a ground station. More particularly, the aircraft is particularly well suited to serve as part of a satellite downlink system, which would also include a satellite 302, a ground station 300, and the signals traveling between them. This type of mission can be useful in the architecture of a wide variety of communication systems.

Typically, communications between a ground station and a satellite use some type of radio wave signal, such as a microwave signal, which can pass through various atmospheric phenomena, such as clouds, without interference. Some of these signals are omnidirectional, and some are directed toward a target with a given beamwidth. However, for a given level of receiver sensitivity and background noise, the signal strength that is required to carry a particular bandwidth increases substantially with the distance between the ground station and the satellite, even if the broadcasting antenna has a relatively narrow beamwidth. Receiver sensitivity can be increased with antenna size, but that carries a mass tradeoff, which is costly for satellite systems. Furthermore, with the limited exception of geostationary satellites, satellites follow a groundtrack crossing back and fourth over the equator that causes variation in their distance and direction from the ground station and requires large pointing adjustments in directional antennas (such as to periodically switch from satellite to satellite). Depending on the ground track of the satellite (or group of satellites), ground stations may require extensive amounts of power to maintain a downlink with distant satellites.

Therefore, the signal strength is typically a limiting factor on the available bandwidth for the downlink, and, for directional ground station, the directional antenna typically must have the ability to track its target. Furthermore, to the extent that the signal strength can be increased, the increase broadens the geographic area that will experience significant interference from the signal, particularly if the signal has a wide beamwidth or is omnidirectional (such as is used for cellular communications). In sum, the communications bandwidth is limited by the altitude of the satellite above the ground station, by the maximum ground distance (i.e., degrees latitude and longitude) between the ground station and the satellite, by receiver sensitivity (such as from antenna size), by beamwidth, and by power level. Additionally, for at least some applications, the communications bandwidth is limited by background noise levels and by limitations on the allowable interference with other location's signals. Furthermore, if narrow beamwidth ground station antennas are used to reduce the power requirements, significant costs can be incurred and additional risks of failure can occur due to the precision of the tracking requirements.

Satellite-to-satellite communication signals, or satellite to non-orbiting spacecraft uplinks, do not necessarily suffer these types of constraints, as they can use high frequency signals, e.g., lasers or other optical signals, to achieve a broad bandwidth over large distances with limited power. Those signals can degrade rapidly when passing through atmospheric phenomena such as clouds. Therefore such high frequency communication signals are typically limited to inter-satellite communication, or to communication between satellites and ground locations that do not tend to experience atmospheric phenomena such as clouds.

The preferred embodiment of the present invention can provide for a significant increase in ground-to-space communication bandwidth by providing a sub-orbital platform 304 to transform a radio wave signal from a ground station 300, such as a microwave signal, to an optical signal directed toward a satellite, or other spacecraft. While this communication link could be in either direction, preferably the communication link is bidirectional.

For this function, the preferred sub-orbital platform, the aircraft 10 of the invention, includes a microwave transceiver 310 with a downward-pointing antenna for communicating with an microwave transceiver 312 with an upward-pointing antenna at the ground station, and an optical transceiver 314 with a upward-pointing antenna for communicating with a optical transceiver 316 with a downward-pointing antenna in the satellite. The aircraft is preferably elevated to an altitude above typical altitudes for substantial atmospheric optical interference, such as from clouds 318, and preferably low enough to maximize signal bandwidth between the ground station and the aircraft. Preferably the aircraft has a plurality of antennas for ground stations, each of these ground-oriented antennas preferably being aimable.

Most preferably the aircraft operates between the altitudes of 50,000 feet nd 70,000 feet, and does so for 200 hours or longer (and more preferably for 300 ours or longer). The communications system created, using this aircraft preferably operates at a ground station microwave power level that would prohibit significant communication (i.e., communication of a significant bandwidth) over the distance between the ground and low-orbit altitudes.

Preferably, the aircraft is stationed in a relatively stationary position with respect to the ground, thus limiting or removing the necessity for the ground station to track the aircraft. In particular, the aircraft preferably operates within a 7000 foot diameter circle, and with a 1000 foot altitude range, and more preferably substantially within or close to a 4000 foot diameter circle. Furthermore, the aircraft preferably operates within a 1000 foot vertical range, or more preferably within or close to a 100 foot vertical range.

Acting as a sub-orbital platform to relay radio wave signals 306 from a ground station 300 through to a satellite 302 using optical signals 308, the aircraft provides numerous advantages, and can conduct various missions. For example, such an aircraft can be quickly replaced if it develops mechanical difficulties. Likewise, such aircraft can operate within a relatively close distance to each other, using frequencies that could interfere with each other at higher power levels (for broad beamwidth or omnidirectional signals), because the radio wave signals to each of the aircraft are of a substantially lower power level than would be required to provide a similar bandwidth to a satellite in orbit. This can be further augmented with a closed loop signal-strength control system to minimize power usage to necessary levels for the various signals.

By using upward-pointing ground antennas and/or downward-pointing satellite antennas having limited beamwidth, the power usage can be further minimized. Each of these aimable antennas delimits an area of airspace that the aircraft must remain within. If both an upward-pointing ground antenna and a downward-pointing satellite antenna is used, they must be aimed to mutually define an area of airspace that the aircraft can maintain a flight pattern within.

To maintain station within the delimited airspace, the aircraft will preferably be a slow flying aircraft. The flight pattern will typically be aspirin shaped, being generally circular, with a certain amount of vertical variation. However, it should be understood that in high wind conditions, the preferred flight pattern could vary from a zig-zagging pattern where the aircraft tacks back and fourth in a generally upwind direction, to a straight upwind flight.

The aircraft can function to facilitate communication between a single ground station and a single spacecraft, such as a geostationary (or other geosynchronous) satellite, or it can communicate with a series of lower orbiting satellites that sequentially pass within the aircraft's range of optical communication, as depicted in FIG. 16A. Preferably, an aircraft designed for switching between satellites will include two optical communications devices 314, 320, so as to acquire a communication link with a second satellite 322 before breaking its communication link with the first satellite 302.

Figure 16D:
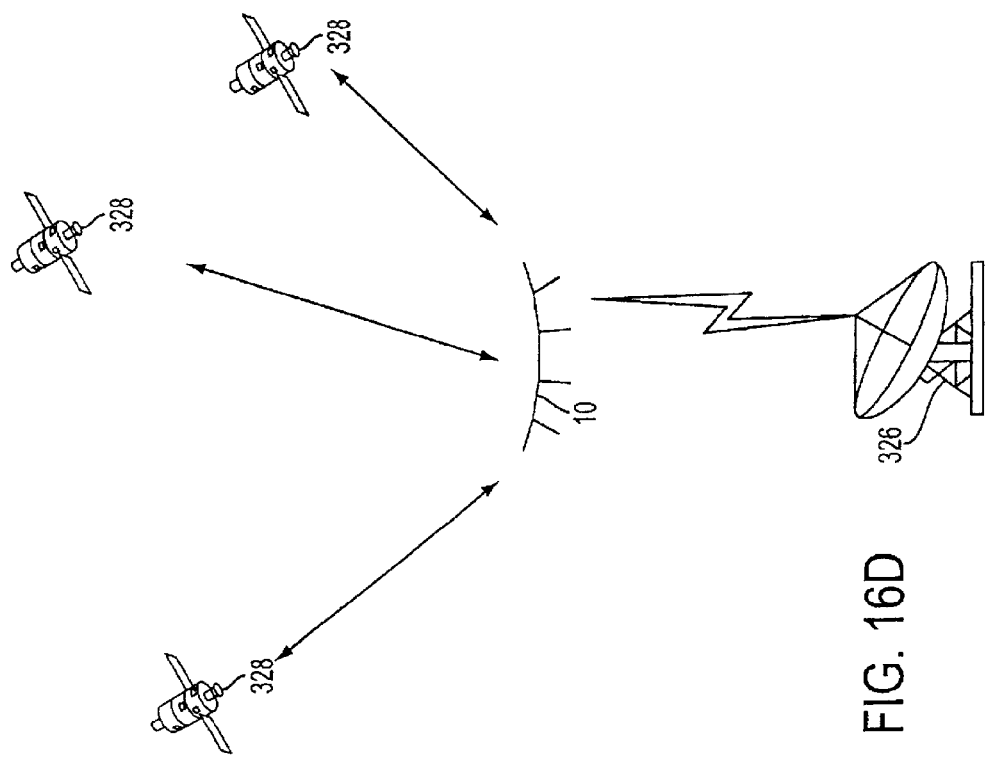
FIG. 16D is an illustrative view of the communications system of FIG. 16A, where the aircraft simultaneously communicates with three different satellites.
Figure 16B:
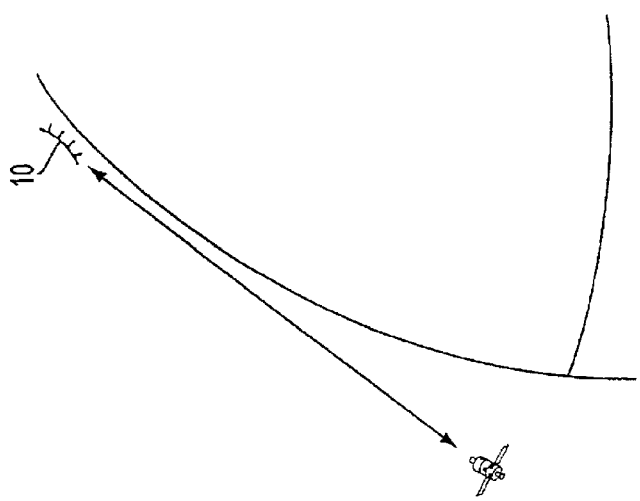
FIG. 16B is an illustrative view of the communications system of FIG. 16A, where the satellite is at a significantly different latitude than the ground station.

As depicted in FIG. 16B, in one mission variation, the aircraft 10 can be used at more northern or southern latitudes, where constant and direct access to communications satellites might not otherwise be readily available. By stationing the aircraft at adequate sub-orbital altitudes, the aircraft can establish communications with satellites 324 that are over 80 degrees latitude away, the satellite likely being closer to the Equator.

The aircraft can advantageously take advantage of most any non-equatorial station by using directional signals that reuse wavelengths that are dedicated to equatorial satellites. In particular, a particular ground station can directionally broadcast two different signals using the same wavelength, by directing one toward a geosynchronous satellite and the other toward the aircraft. Unlike non-equatorial satellites, the aircraft is not required to cross the equator, and thus the ground station need not periodically switch to a new broadcast direction (such as occurs when the ground station must switch satellites). Naturally, for a given aircraft location, some ground stations will not be able to broadcast on the same frequency as is broadcast to the satellite because the two directional signals will overlap (e.g., the signals might overlap if the aircraft is somewhat north of the equator and the ground station is farther north of the equator).

Figure 16C:
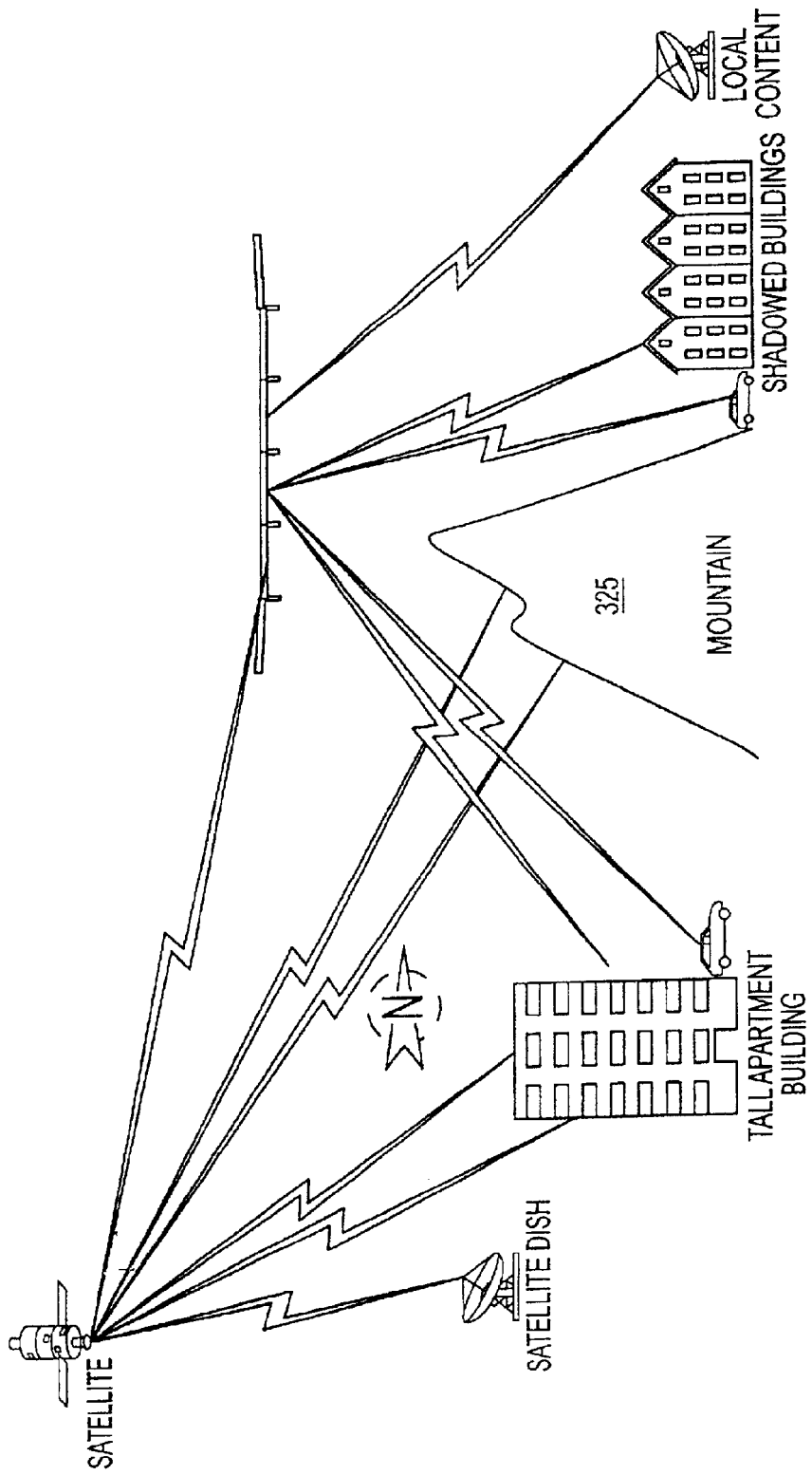
FIG. 16C is an illustrative view of the communications system of FIG. 16A, where the aircraft communicates with multiple ground stations and the satellite is obstructed from one or more of the ground stations by a mountain.

Likewise, as depicted in FIG. 16C, the system can be used to circumvent mountains 325 and other obstacles. This feature can be used for ground station to satellite linkups, and likewise used for ground station to ground station linkups. This is a particularly effective use of the system, since neither ground stations nor satellites are typically repositionable without great effort and/or expense. One potentially effective use for such a system is overcoming the effect of obstacles on signals that are widely broadcast, such as television signals. The source of these television signals could be a ground station, a satellite, or even another aircraft. Another potentially effective use is frequency reuse in broadcasting to multiple, geographically separated ground stations using the same frequency. This is advantageous in that the satellite, being farther away, would require a narrower beam width to have separate communications with the two ground stations using the same frequency.

Another related mission for one or more of the aircraft 10 is in a communications system where the aircraft serve as regional hubs, relaying communications between end users located in spot beams, and communications networks. The communications networks can be either terrestrial based, accessed via ground antennas or space based, accessed via optical or extremely high frequency microwave links.

Figure 16E:
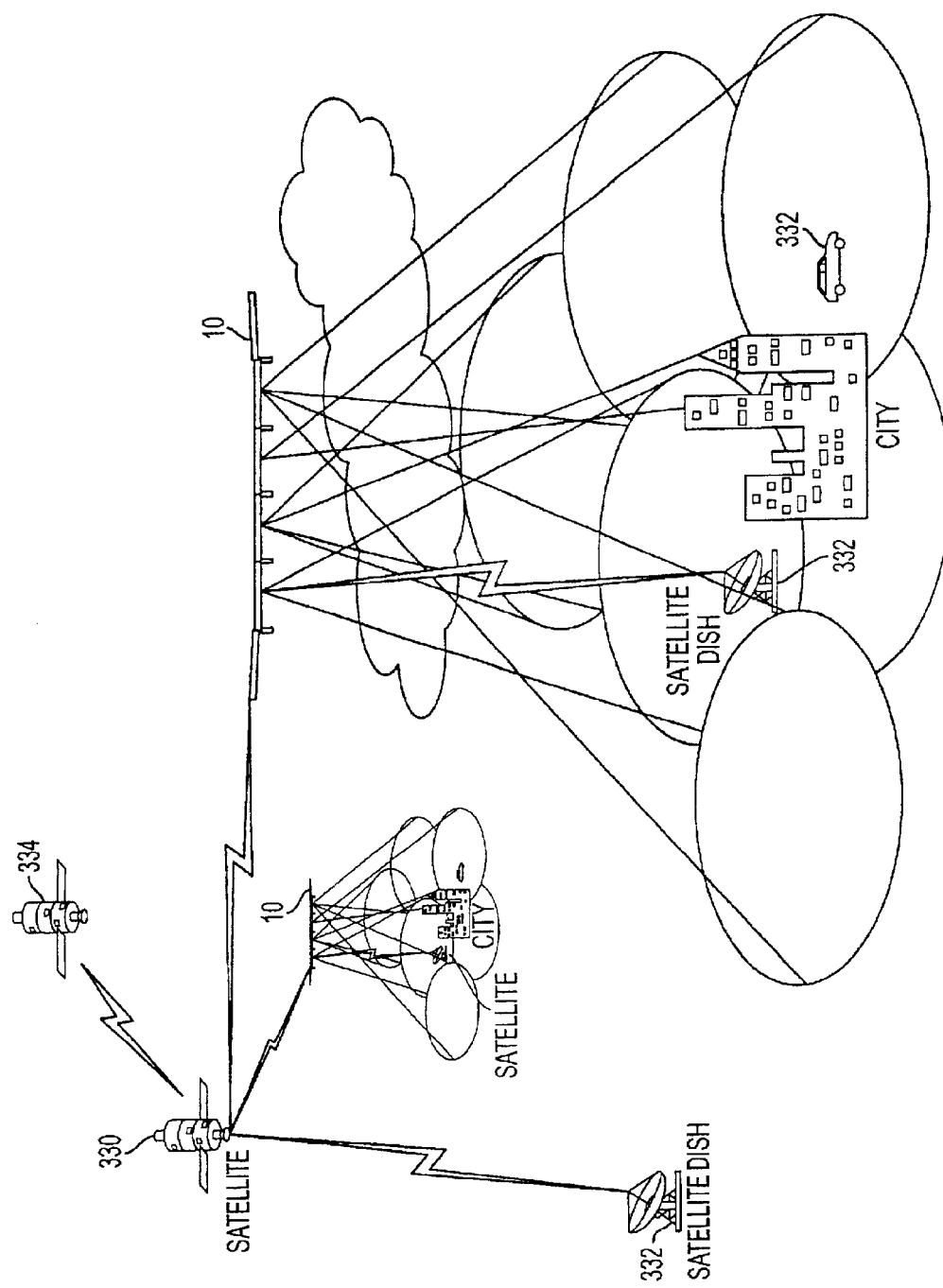
FIG. 16E is an illustrative view of the communications system of FIG. 16A, where the satellite simultaneously communicates directly with two aircraft and a ground station.
Figure 16F:
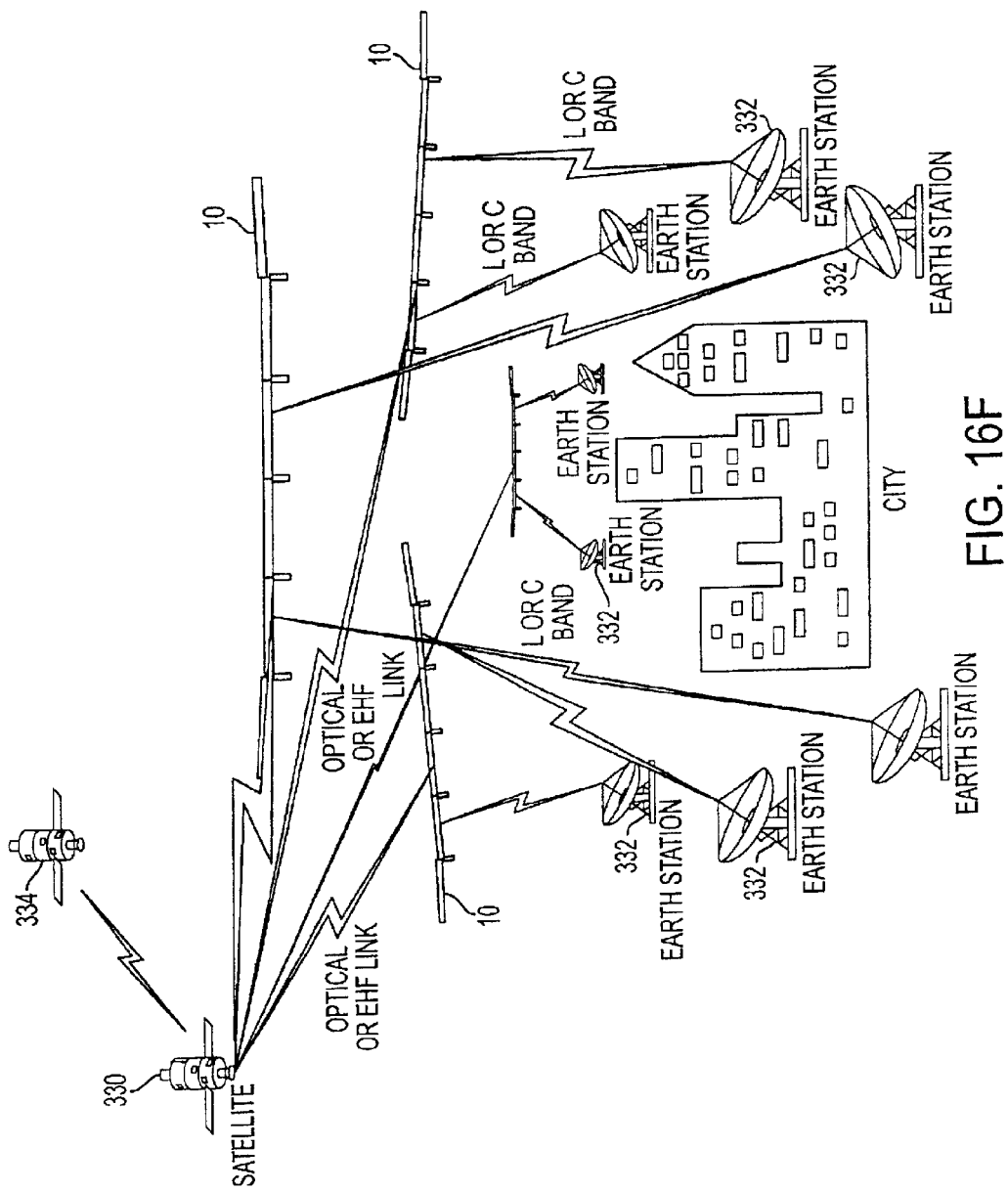
FIG. 16F is an illustrative view of the communications system of FIG. 16A, where one satellite communicates with multiple aircraft, each of which serves as a base station for communicating with multiple ground stations.

One such related mission, depicted in FIG. 16D, is as a communications hub, communicating simultaneously between a ground station 326 and a plurality of satellites 328. In this mission, the aircraft would require a larger number of optical transceivers, and would need to generate additional power to operate the transceivers. Alternately, as depicted in FIGS. 16E and 16F, two coverage regions are shown with one airplane providing coverage over each one. In particular, one or more of such aircraft 10 can all communicate with a single satellite 330, thus connecting one or more ground stations with a single satellite that acts as a communications hub. This potentially provides for frequency reuse by each aircraft (i.e., each aircraft can use the same set of available frequencies), increasing available bandwidth between the satellite and the ground.

This scenario can provide for increased bandwidth between a densely populated area and a satellite (see, FIG. 16E), or between a satellite and two distant locations (see, FIG. 16F). The later scenario provides for extremely high amounts of data to be passed between a satellite and a city. It provides for different paths to reuse lower frequencies near the ground, and optical or extremely high frequency microwave links to communicate between the aircraft and the satellite. That satellite can, in turn, act as a hub and communicate with one or more other satellites 334, which can also use sub-orbital platforms for ground communication. Additionally, direct aircraft to aircraft communications can also be used. As these examples demonstrate, the aircraft can serve as part of the architecture of a variety of communications systems.

While the above-described preferred embodiment used microwave and optical signals, it should be understood that the system is operable for a wide variety of signals. In particular, it is known that atmospheric moisture interferes significantly with radio wavelengths of approximately one millimeter or smaller (i.e., higher frequency signals, above twenty gigahertz), but not as much with greater wavelengths (i.e., lower frequency signals, below twenty gigahertz). Thus, the system can preferably be operated using a ground station to aircraft radio signal having a wavelength greater than one millimeter, and an aircraft-to-satellite radio signal having a wavelength less than one millimeter. Furthermore, using the aircraft of the above invention to redirect and/or amplify a signal, power can be conserved even if the aircraft to satellite portion of the system operated with a signal that would pass through atmospheric disturbances, such as a signal identical to that used in the ground station to aircraft portion of the system.

Broadband Distribution System

Figure 17A:
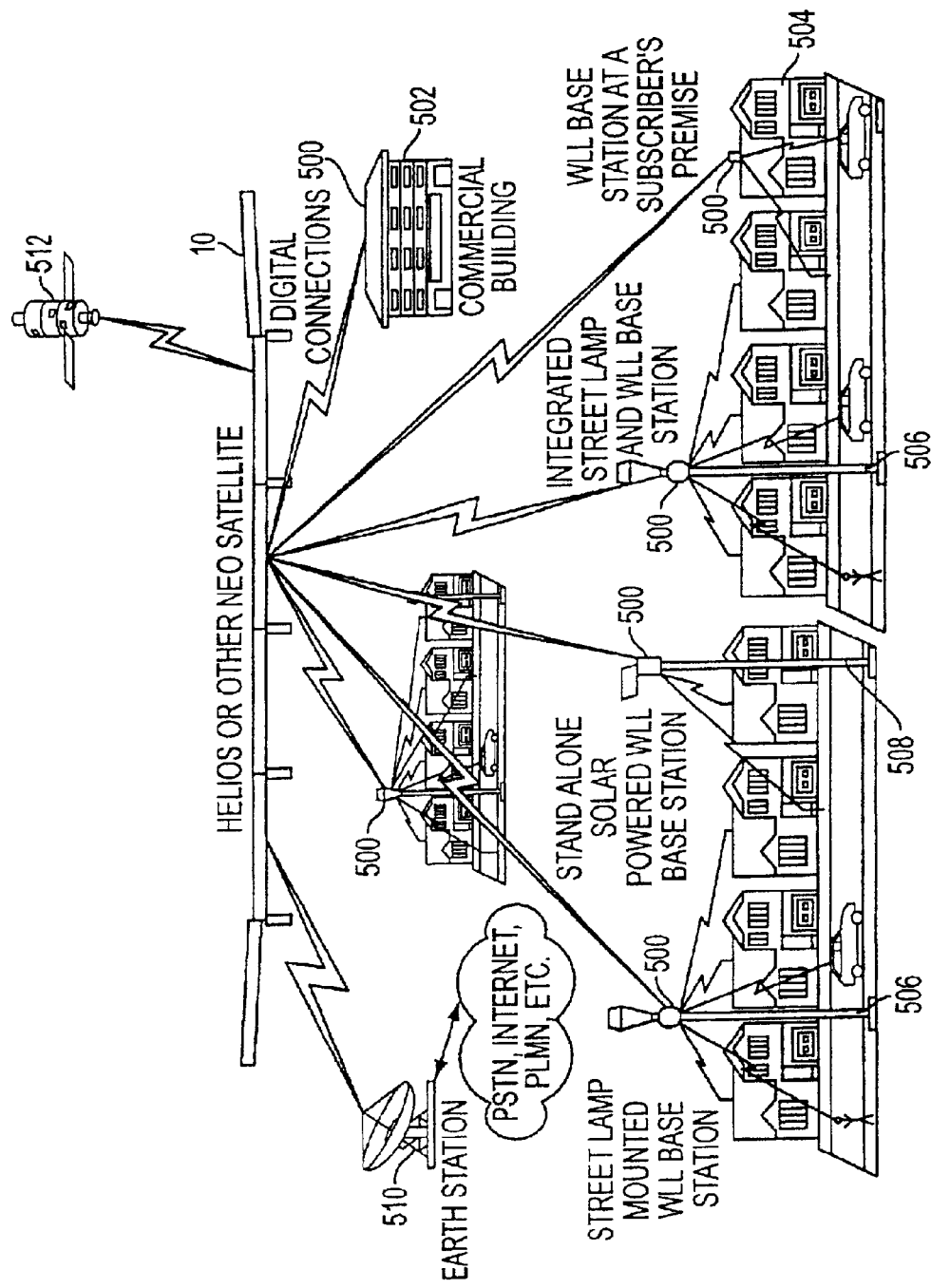
FIG. 17A is an illustrative view of the aircraft depicted in FIG. 1, acting as a high altitude, sub-orbital platform base station in a broadband, wireless local loop or other communications system with subscriber base stations and subscriber remote stations.

With reference to FIG. 17A, another type of mission, for which the aircraft of the invention is well suited, is as part of a wireless local loop, broadband and/or other communications network.

Various forms of communication, such as mobile and residential voice telephony, mobile and residential Internet access, and broadband data access, each have differing transmission requirements. For example, voice telephony requires a relatively low level bandwidth (e.g., 4 to 64 KBps) for extended periods of time (e.g., 2 to 30 minutes), Internet access requires a larger bandwidth (e.g., 64 to 2000 KBps) for very limited periods of time (e.g., a few seconds), and broadband access is based upon a large bandwidth (e.g., 1 MBit or higher) on a nearly continuous basis.

To provide for such communication requirements, a variety of network architecture are typically developed, leading to various forms of networks. Included among these are land-line telephone networks, cellular networks, wireless local loops, and various stratospheric satellite-based networks.

Typically, different equipment is required to support each of these technologies. However, in some cases, such networks can serve more than one function. For example, broadband technology can be brought to fixed location end users by the use of ASDL (asymmetric digital subscriber line) technology delivered via terrestrial wires. Nevertheless, most of these different types of networks typically require extensive and expensive infrastructures of wire to interconnect either users or cellular towers.

If satellites are used in the network, they typically have difficulties providing multiple access to users in high density areas. Development of equipment meeting the strict weight and power requirements for use in a satellite is expensive. Furthermore, support is difficult due to limited frequency reuse and the excess power margin required for transmission to less then ideal locations where mobile users can choose to go. Furthermore, significant bands of frequencies are unusable due to their inability to penetrate atmospheric moisture or other disturbances.

Cellular and PCS systems excel at penetration into buildings and hard to reach places through the use of excess power and significant frequency reuse. However, these systems require significant broadband connectivity between base stations and/or transmission towers.

For reasons such as those above, it is difficult for a communications company to initially deploy into regions that lack an existing infrastructure, or regions having a proprietary infrastructure that is not available for use. The present invention provides for an inventive network architecture that, in various embodiments, addresses one or more of these concerns.

As seen in FIG. 17A, this embodiment of the present invention includes the use of one or more high-altitude platforms, which could be aircraft (solar or conventional, manned or unmanned), or even balloons, to provide broadband point to multi-point connectivity between fixed ground locations. Alternatively, near Earth orbit (NEO) satellites could be used. Preferably, this high-altitude platform is an aircraft 10, as described above, that circles or holds position at or close to one location relative to the ground.

The aircraft serves as a sub-orbital platform base station that maintains preferably broadband communication signals with and between a variety of ground stations 500, typically at fixed ground locations, potentially including the roofs of subscribers' commercial buildings 502 and subscribers' residential buildings 504. At least some of the ground stations are preferably configured as base stations to distribute data or voice channels to one or more remote subscriber stations that are typically local fixed or mobile users. In addition to buildings, the ground base stations can also be integrated within or mounted on street lamps 506, signs, stand alone towers 508 or other structures. The subscriber base stations (both commercial and residential) are preferably also networked to subscribers' access ports on their premises, either by wired or wireless connection. Links to other networks, such as a PSTN (public switched telephone network), PLMN (Public Land Mobile Network) or to the Internet, can be provided by separate ground stations 510, by satellite networks 512, or by access through existing subscriber base stations, where access links to such networks are available at the subscriber base stations.

Figure 17B:
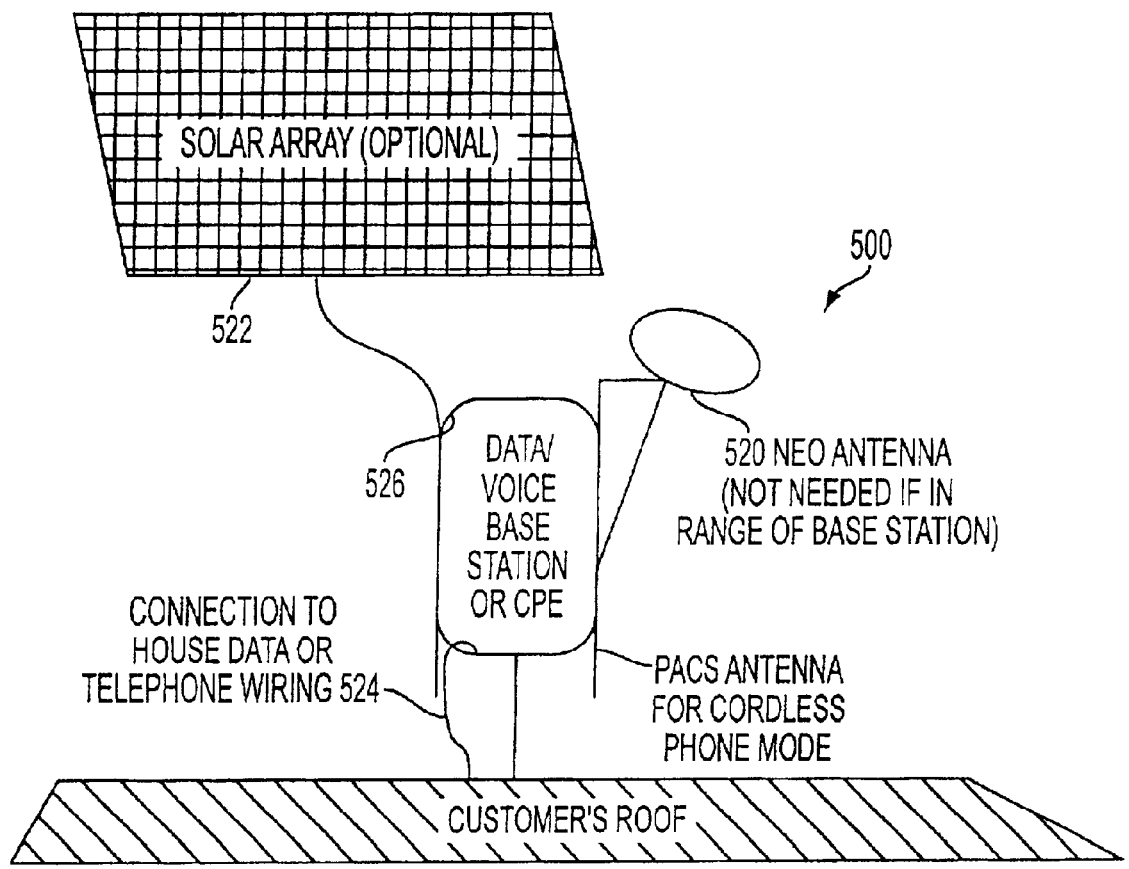
FIG. 17B is a view of a subscriber base station for use with the communications system illustrated in FIG. 17A.

As depicted in FIG. 17B, a subscriber's ground base station 500 typically is configured with an antenna 520 for maintaining a broadband or wireless loop link with the aircraft. Optionally, solar arrays 522 can be used to minimize the power drawn by the subscriber base station through a power connection 524. The various forms of ground base stations can be configured to serve either individual subscribers or large numbers of subscribers. To serve other subscribers, whether mobile, or fixed in the local area of the ground base station, a wireless local loop is preferably used, although a wired network can also be used to reach fixed locations. To communicate with the other, remote subscribers, the subscriber base station preferably has an antenna 526 appropriate to the selected wireless standard of the related remote subscriber stations. As an example, the remote subscriber stations could be cordless telephones that are possessed by subscribers that are otherwise unaffiliated with the subscriber base station, its associated subscriber, and the building that it resides on.

A wide variety of communications standards, including wireless local loops, can be used in linking the subscriber base stations (or other ground base stations) to subscribers having remote subscriber stations. Compatible wireless communication standards include AMPS (advanced mobile phone service), TACS (Total Access Communications System), NMT (Nordic Mobile Telephone system), IS-95 (code division multiple access American digital cellular standard), IS-54/IS-136 (USA cellular standard, also known as D-AMPS), B-CDMA (broadband code division multiple access), W-CDMA (wideband code division multiple access), UMTS (Universal Mobile Telecommunications Service), or other 3G, PHS (Personal Handyphone System), DECT (Digital Enhanced Cordless Telephony), PACS (Personal Advanced Communication System), PDC (Personal Digital Cellular), CDPD (Cellular Digital Packet Data), Mobitex (Ericsson standard for wireless packet data networks) and RD-LAP (Motorola-developed wireless packet data network). A wide variety of services can thus be transmitted to these subscribers, including voice telephony, e-mail, Internet Access, facsimile, video telephony and video conferencing.

Figure 17C:
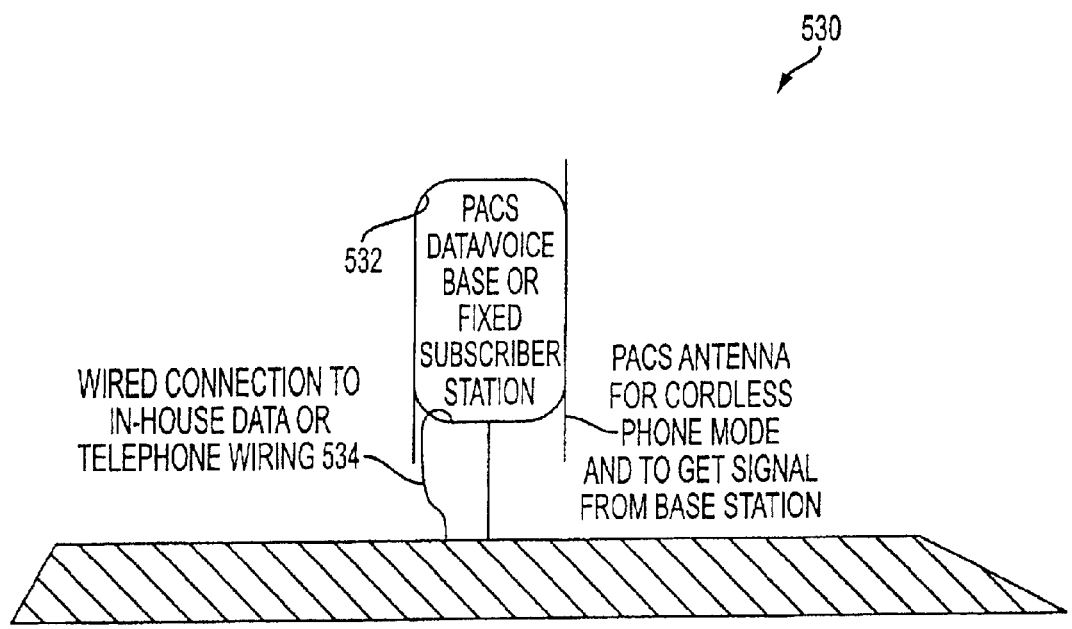
FIG. 17C is a view of a subscriber remote station for use with the communications system illustrated in FIG. 17A.

As depicted in FIG. 17C, a subscriber remote station 530 would preferably include an antenna 532 appropriate to the wireless standard used by the subscriber remote station's related ground base station. These subscriber remote stations would have wired or wireless networked connections 534 to the individual devices of the subscribers.

As can be seen from the above description of this distribution system, this aspect of the invention provides for an information distribution system without the installation of extensive infrastructure. Instead, the system requires only individual subscriber base stations located with the subscribers, or other ground stations, and one or more preferably high altitude, sub-orbital platforms providing communication links to and between the ground stations.

While a particular form of the invention has been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the invention. Accordingly, the invention is not intended to be limited by the above discussion, and is defined with reference to the following claims.

We claim:

1. A method for a mission controller at a ground station to control an aircraft, comprising:

identifying a plurality of communication subsystems between the ground station and the aircraft, wherein the plurality of communication subsystems are at least partially redundant;

establishing communication between the ground station and the aircraft using a first communication subsystem of the plurality of communication subsystems;

operating the first communications subsystem as a communication link for the mission controller to control the aircraft;

monitoring the first communication subsystem to determine information on at least one of: the availability of the first communication subsystem and the reliability of the first communication subsystem;

monitoring a second communication subsystem of the plurality of communication subsystems to determine information on at least one of: the availability of the second communication subsystem and the reliability of the second communication subsystem;

comparing the information determined in the steps of monitoring the first and second communication subsystems; and operating the second communications subsystem as a communication link for the mission controller to control the aircraft if, in the step of comparing, the first communication subsystem is found to be at least one of: unavailable and characterized by less preferable reliability than the second communication subsystem.

2. The method of claim 1, and further comprising establishing and maintaining communication between the ground station and the aircraft using the second communication subsystem while, in the step of comparing, the first communication subsystem is found to be both available and characterized by preferable reliability as compared to the second communication subsystem.

3. The method of claim 1, and further comprising:

monitoring a third communication subsystem of the plurality of communication subsystems to determine information on at least one of: the availability of the third communication subsystem and the reliability of the third communication subsystem; and operating the third communications subsystem as a communication link for the mission controller to control the aircraft if, in the step of comparing, the first and second communication subsystems are both found to be at least one of: unavailable and characterized by less preferable reliability than the third communication subsystem.

4. The method of claim 1, wherein:

at least one of the plurality of communications systems is constituted from a plurality of separate system components, at least one of the plurality of separate system components having information available on at least one of: the availability of the system component and the reliability of the system component; and at least one of the plurality of separate system components that has information available on at least one of: the availability of the system component and the reliability of the system component, is also part of another of the plurality of communications systems.

5. The method of claim 4, wherein:

at least two of the plurality of separate system components have information available on at least one of: the availability of that system component and the reliability of that system component; and at least two of the plurality of separate system components that have information available on at least one of: the availability of that system component and the reliability of that system component, are also part of another of the plurality of communications systems.

6. The method of claim 1, wherein in the step of operating the second communications subsystem, the cost of using at least one of the first and second communication subsystems is a factor in determining which communication subsystem is characterized by less preferable reliability.

7. The method of claim 1, wherein the first and second communication subsystems are at least substantially redundant.

8. The method of claim 7, and further comprising establishing and maintaining communication between the ground station and the aircraft using the second communication subsystem while, in the step of comparing, the first communication subsystem is found to be both available and characterized by preferable reliability as compared to the second communication subsystem.

9. The method of claim 1, wherein the first and second communication subsystems are fully redundant.

10. The method of claim 9, and further comprising establishing and maintaining communication between the ground station and the aircraft using the second communication subsystem while, in the step of comparing, the first communication subsystem is found to be both available and characterized by preferable reliability as compared to the second communication subsystem.

* * * * *